United States Patent
Ikeuchi et al.

(10) Patent No.: US 7,370,148 B2
(45) Date of Patent: May 6, 2008

(54) STORAGE SYSTEM, CONTROL METHOD THEREOF, AND PROGRAM

(75) Inventors: Kazuhiko Ikeuchi, Kawasaki (JP); Mikio Ito, Kawasaki (JP); Hidejiro Daikokuya, Kawasaki (JP); Shinya Mochizuki, Kawasaki (JP); Hideo Takahashi, Kawasaki (JP); Yoshihito Konta, Kawasaki (JP); Yasutake Satou, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 331 days.

(21) Appl. No.: 11/169,979

(22) Filed: Jun. 30, 2005

(65) Prior Publication Data

US 2006/0206752 A1    Sep. 14, 2006

(30) Foreign Application Priority Data

Mar. 14, 2005    (JP) .............................. 2005-070963

(51) Int. Cl.
  G06F 12/00    (2006.01)
  G06F 13/00    (2006.01)
  G06F 11/00    (2006.01)

(52) U.S. Cl. ........................ 711/114; 711/113; 711/118; 711/141; 711/143; 714/6

(58) Field of Classification Search ..................... None
See application file for complete search history.

(56) References Cited

U.S. PATENT DOCUMENTS

| | | | |
|---|---|---|---|
| 5,848,229 A * | 12/1998 | Morita | ........................... 714/7 |
| 5,954,822 A | 9/1999 | Yashiro et al. | |
| 6,408,400 B2 | 6/2002 | Taketa et al. | |
| 6,816,981 B2 | 11/2004 | Morita | |

FOREIGN PATENT DOCUMENTS

| | | |
|---|---|---|
| JP | 6-119126 | 4/1994 |
| JP | 11-143649 | 5/1999 |
| JP | 2001-344076 | 12/2001 |

* cited by examiner

Primary Examiner—Alford Kindred
Assistant Examiner—Shawn Gu
(74) Attorney, Agent, or Firm—Staas & Halsey LLP

(57) ABSTRACT

When a write-back request for writing back new data in a cache memory to disk devices forming a redundant configuration of RAID is generated, a write-back processing unit, reserves a parity buffer area in the cache memory, generates new parity, and then, writes the new data and the new parity to the corresponding disk devices. When an error in which the consistency of RAID is broken occurs in a plurality of the disk devices upon write performed by the write-back processing unit, a recovery processing unit reserves, in the cache memory, a cache stripe area storing data of the entire stripe including the new data which is to be written back, and causes the cache control unit to manage it.

20 Claims, 22 Drawing Sheets

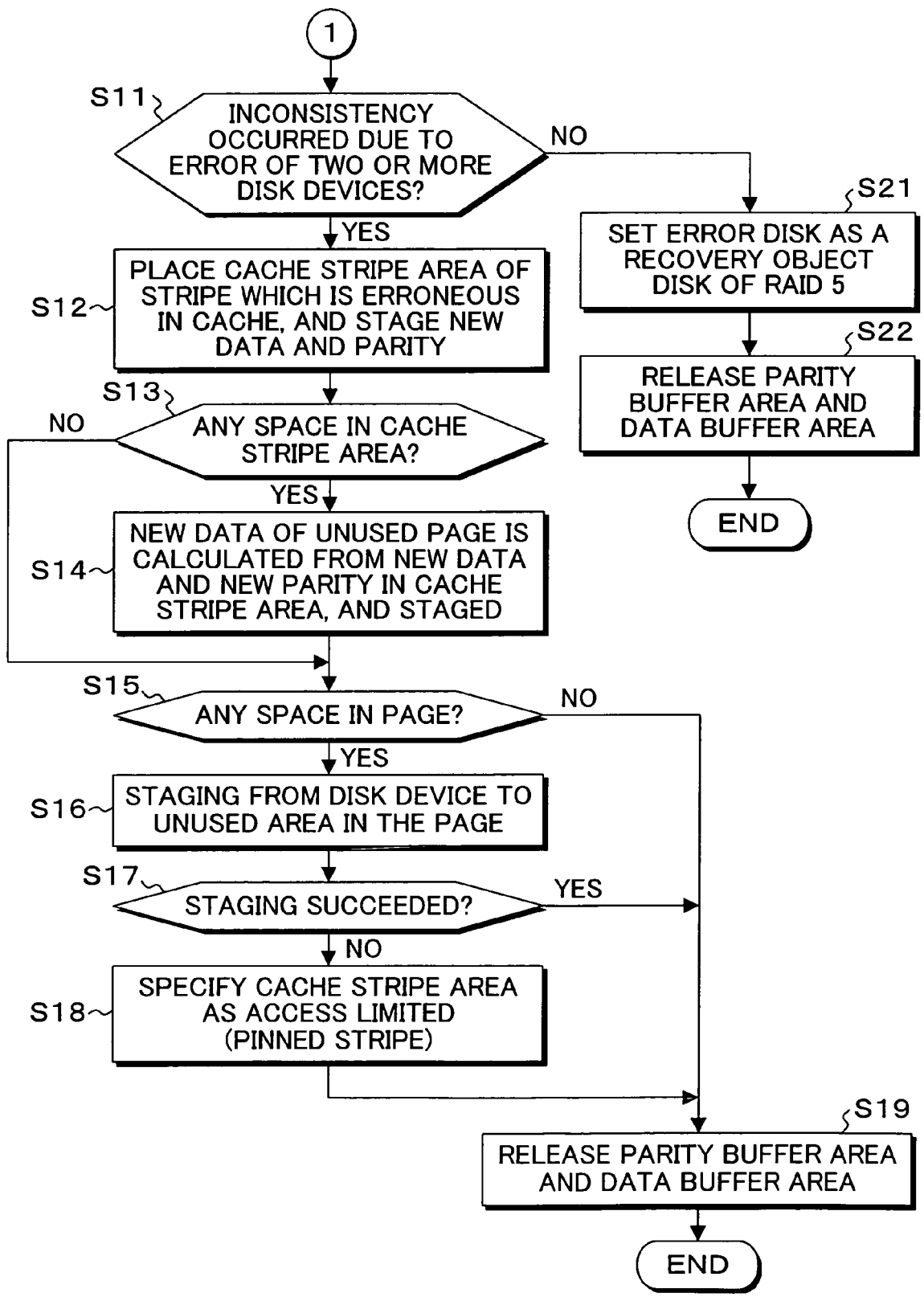

STORAGE SYSTEM, CONTROL METHOD THEREOF, AND PROGRAM

This application is a priority based on prior application No. JP 2005-070963, filed Mar. 14, 2005, in Japan.

BACKGROUND OF THE INVENTION

1. Field of the Invention

The present invention relates to a storage system, a control method thereof, and a program for processing, via a cache memory, input/output requests from an upper-level device to storage devices of a RAID configuration; and particularly relates to a storage system, a control method thereof, and a program for writing back latest data which has been updated in a cache memory to storage devices which are forming a redundant configuration of RAID 5.

2. Description of the Related Arts

Conventionally, in a RAID device for processing input/output requests from a host, in the manner of FIG. 1, a cache memory 102 is provided in a control module 101 of a RAID device 100, and the input/output requests from a host to disk devices 104-1 to 104-4 which are constituting a RAID-5 group 105 are configured to be processed in the cache memory 102. Cache data of such RAID device 100 is managed in page units, and, in the manner of FIG. 2, a cache page 106 is managed such that, for example, 66,560 bytes serves as one page. The cache page 106 comprises user data in a plurality of block units serving as an access unit of a host, wherein one block of the user data is 512 bytes, 8-byte block check code (BCC) is added thereto at every 512 bytes, and a unit of 128 blocks of the 520-byte block is managed as one page, therefore, one page is 520×128=66,560 bytes. A cache management table called a cache bundle element (CBE) is prepared for managing the cache pages 106. In the cache management table, a management record corresponding to every one page is present, and the management record retains, for example, a logical unit number LUN, a logical block address LBA, and a dirty data bitmap of dirty data in which one block is represented by one bit. One page of the cache management table has the same size as the size of a strip area of each of the disk devices constituting a RAID group. Herein, when RAID 5 is used as the redundant configuration of the RAID device 100, a cache area 108 for storing cache data is provided in the cache memory 102, and, separate from the cache area 108, a data buffer area 110 for storing old data and old parity and a parity buffer area 112 for storing new parity are provided as work areas for generating new parity in a write-back process. In a write-back process, for example, if a request for writing back new data (D2) new which is present as one-page data in the cache area 108 to the disk device 104-2 is generated, the write-back process is carried on after the data buffer area 110 and the parity buffer area 112 are reserved in the cache memory 102. Herein, since the new data (D2) is written to one of the disk devices, this write-back process is called small write. In the small write, old data (D2) old is read out from the disk device 104-2 and stored in the data buffer area 110, and old parity (P) old is read out from the disk device 104-4 and stored in the data buffer area 110 as well. Subsequently, an exclusive OR (XOR) 116 of the new data (D2) new, the old data (D2) old, and the old parity (P) old is calculated, thereby obtaining new parity (P) new, and it is stored in the parity buffer area 112. Lastly, the new data (D2) new and the new parity (P) new is written to the disk devices 104-2 and 104-4, respectively, and the process is terminated. The write back in a case in which new data is present in the manner corresponding to all of the disk devices 102-1 to 102-3 (entire data of the stripe area) is called band-wide write; and in the band-wide write, new parity is calculated as the exclusive OR of all the data corresponding to the strip areas of the disk devices 104-1 to 104-3, and write to the disk devices 104-1 to 104-4 is performed so as to terminate the process. In either case, the data buffer area 110 and the parity buffer area 112 are released when write is completed. Incidentally, in such RAID device forming the redundant configuration of RAID 5, for example, as shown in FIG. 3, if errors occur in, for example, two disk devices 104-3 and 104-4 in a write-back process, there generated failure in which the consistency of data according to RAID 5 is broken in the stripe area of the disk devices 104-1 to 104-4. That is, as a result of the failure of the write-back process, merely the disk device 104-2 has the new data (D2) new, and the disk devices 104-3 and 104-4 remain to have the old data (D3) old and the old parity (P) old. In the state in which the consistency is broken in the above described manner, if the disk device 104-1 further fails in the manner of FIG. 4, thereby degenerating the RAID-5 group and resulting in a three-device configuration, since a request from a host 118 for reading the data D2 results in miss-hit in the cache memory 102, staging from the disk device 104-1 is attempted. However, since it is in a degenerated state in which the disk device 104-1 has failed and eliminated from the RAID-5 group 105, Regeneration Read for recovering the data D1 through exclusive OR of the data of the normal disk devices 104-2 to 104-4 and parity will be executed. However, since the consistency of the data of the disk devices 104-2 to 104-4 and the parity has been broken, garbled data (D?) may be restored through the exclusive OR. Incidentally, in the RAID device, control modules provided with cache memories are duplexed for ensuring reliability, and the parity generated in a write-back process is saved in a control module in the backup side. Therefore, when, like FIG. 4, a disk device fails, thereby causing degeneration in a state in which the consistency of the disk devices has been broken due to an error in a write-back process, in the manner of FIG. 5, a control module 101-1 obtains new parity (P) new which is saved in a control module 101-2 in the backup side, and performs write correction (Write Correct) for writing the new data (D2) new and D(3) new in the cache memory 102 to the corresponding disk devices 104-2 to 104-3, so as to recover the consistency of the disk devices 104-1 to 104-4.

[Patent Document 1] Japanese Patent Application Laid-Open (kokai) No. H05-303528

[Patent Document 2] Japanese Patent Application Laid-Open (kokai) No. H08-115169

However, in such conventional cache control process, if there occurs degeneration in which failure occurs in the control module and the process is transferred to the backup control module, parity cannot be saved; therefore, if the consistency of the disk devices of the RAID group is broken, recovery of the consistency by means of write correction using parity such as that of FIG. 5 cannot be performed. Thereat, in the manner of FIG. 6, the control module 101-2, which has taken over the process as a result of the error of the control module 101-1, cannot obtain parity in the cache memory 102; therefore, parity (P) is recalculated (Recalculate) through exclusive OR of the data in the disk devices 104-1 to 104-3 and written to the disk device 104-3, thereby recovering the consistency of the disk devices 104-1 to 104-4, and then, in the manner of FIG. 7, after new parity (P) new is calculated from the new data (D2) new and (D3) new remaining in the cache memory 102, normal write back for performing write on the disk devices 104-2 to 104-4 is performed. However, if, in a state in which the control modules are degenerated like FIG. 7, the disk device 104-1 further fails and the RAID-5 group 105 is degenerated, recalculation of parity cannot be performed in the degenerated RAID-5 group 105 unlike FIG. 6; therefore, the consistency cannot be recovered, and, unless access to the entire stripe of the RAID-5 group is prohibited, risks of data garbling are generated, which is problematic. According to the present invention, there are provide a storage system, a control method thereof, and a program for recovering an error occurred in access in a case in which the consistency of the RAID-5 group has been broken and degeneration of the storage devices has occurred, thereby improving reliability of data with respect to accesses.

SUMMARY OF THE INVENTION

The present invention provides a storage system. The storage system of the present invention is characterized by comprising a cache control unit for managing data in a cache memory in a page area unit, and processing an input/output request from an upper-level device to a storage device;

a RAID control unit for managing data in each of a plurality of the storage devices in a strip area unit having the same size as the page area and managing a plurality of strip areas for data and one strip area for parity having the same address collectively in a stripe area unit, and forming a redundant configuration of RAID in which the storage device on which the strip area for parity is placed is changed every time the address of the stripe area is changed;

a write-back processing unit for, when a write-back request for writing back new data in the cache memory to the storage device is generated, reserving a parity buffer area in the cache memory, generating new parity, and then, writing the new data and the new parity to the corresponding storage devices; and a recovery processing unit for, when an error in which the consistency of RAID is broken occurs in a plurality of the storage devices upon write performed by the write-back processing unit, reserving, in the cache memory, a cache stripe area storing data of the entire stripe including the new data which is to be written back, and causing the cache control unit to manage it.

Herein, when errors occur in two or more storage devices upon write performed by the write-back processing unit, the recovery processing unit determines that the error in which the consistency of the RAID is broken has occurred.

After reserving the cache stripe area, the recovery processing unit causes the write-back processing unit to release the parity buffer area storing the new parity.

If an unused area is present in the cache stripe area, the recovery processing unit stages new data, which is obtained through exclusive OR of new data which is in the same area and the new parity in the parity buffer area, to the unused area.

If an unused area to which new data obtained through exclusive OR of new data which is in the same area and the new parity in the parity buffer area cannot be staged is present in the cache stripe area, the recovery processing unit stages data, which is read out from the storage device, to the unused area.

If the staging of data from the storage device to the unused area fails, the recovery processing unit designates the cache stripe area as an access-restricted area (Pinned Stripe), and causes the cache control unit to manage it.

If read is requested from an upper-level device to the cache stripe area which is designated as the access-restricted area, the cache control unit subjects hit data to read response upon cache hit, and, upon cache miss hit, performs read response upon cache hit after executing staging prohibiting data recovery (Regeneration Read), which is based on the redundant configuration of RAID, from the storage devices.

If write is requested from an upper-level device to the cache stripe area which is designated as the access-restricted area, the cache control unit writes write data to a corresponding area.

If a write-back request of the cache stripe area, which is designated as the access-restricted area, is generated after the errors of the storage devices are eliminated, and if the write-back processing unit executes staging prohibiting data recovery, which is based on the redundant configuration of RAID, from the storage devices to the unused area in the cache stripe area and data of the entire stripe is reserved, the write-back processing unit reserves a parity buffer area in the cache memory and generates new parity data from the data of the entire stripe, and then, performs a process (band-wide write) of writing the new data and the new parity to the corresponding storage devices.

The present invention provides a control method of a storage system. The control method of a storage system according to the present invention is characterized by comprising a cache control step of managing data in a cache memory in a page area unit, and processing an input/output request from an upper-level device to a storage device;

a RAID control step of managing data in each of a plurality of the storage devices in a strip area unit having the same size as the page area and managing a plurality of strip areas for data and one strip area for parity having the same address collectively in a stripe area unit, and forming a redundant configuration of RAID in which the storage device on which the strip area for parity is placed is changed every time the address of the stripe area is changed;

a write-back processing step of, when a write-back request for writing back new data in the cache memory to the storage device is generated, reserving a parity buffer area in the cache memory, generating new parity, and then, writing the new data and the new parity to the corresponding storage devices; and an error recovery processing step of, when an error in which the consistency of RAID is broken occurs in a plurality of the storage devices upon write according to the write-back processing step, reserving, in the cache memory, a cache stripe area storing data of the entire stripe including the new data which is to be written back, and causing the cache control step to manage it.

The present invention provides a program which is executed by a computer of a storage system. The program of the present invention is characterized by causing the computer of the storage system to execute a cache control step of managing data in a cache memory in a page area unit, and processing an input/output request from an upper-level device to a storage device;

a RAID control step of managing data in each of a plurality of the storage devices in a strip area unit having the same size as the page area and managing a plurality of strip areas for data and one strip area for parity having the same address collectively in a stripe area unit, and forming a redundant configuration of RAID in which the storage device on which the strip area for parity is placed is changed every time the address of the stripe area is changed;

a write-back processing step of, when a write-back request for writing back new data in the cache memory to the storage device is generated, reserving a parity buffer area in the cache memory, generating new parity, and then, writing the new data and the new parity to the corresponding storage devices; and an error recovery processing step of, when an error in which the consistency of RAID is broken occurs in a plurality of the storage devices upon write according to the write-back processing step, reserving, in the cache memory, a cache stripe area storing data of the entire stripe including the new data which is to be written back, and causing the cache control step to manage it.

Note that details of the control method of a storage system and the program in the present invention are basically same as that in the case of the storage system of the present invention.

According to the present invention, when an error which breaks the consistency of a stripe of storage devices occurs in a write-back process of a RAID device having a redundant configuration of RAID 5, and, moreover, the storage devices are also degenerated due to failure or the like, before parity in a parity buffer area is released, a cache stripe area having correct data of the entire stripe including new data which is to be written back is reserved in a cache memory; as a result, data garbling due to data recovery of the failed device which is based on the redundant configuration and performed in response to an access from an upper-level device in a state in which the consistency of RAID 5 is broken is prevented from occurring, and error recovery performance of the RAID device is improved, thereby enhancing reliability of data protection. Moreover, when space is partially present in the cache stripe area, it is designated as an access-restricted area, as a result, when staging is to be performed from the storage devices as a result of miss-hit in response to a read request from the upper-level device to the unused area, staging prohibiting read by means of data recovery which is based on the redundant configuration of RAID 5 is performed, thereby reliably preventing generation of garbled data due to broken consistency of RAID 5. The above and other objects, features, and advantages of the present invention will become more apparent from the following detailed description with reference to the drawings.

BRIEF DESCRIPTION OF THE DRAWINGS

FIGS. 20A and 20B are flow charts of a write-back process including the recovery process of the present invention.

DETAILED DESCRIPTION OF THE PREFERRED EMBODIMENTS

Figure 1:
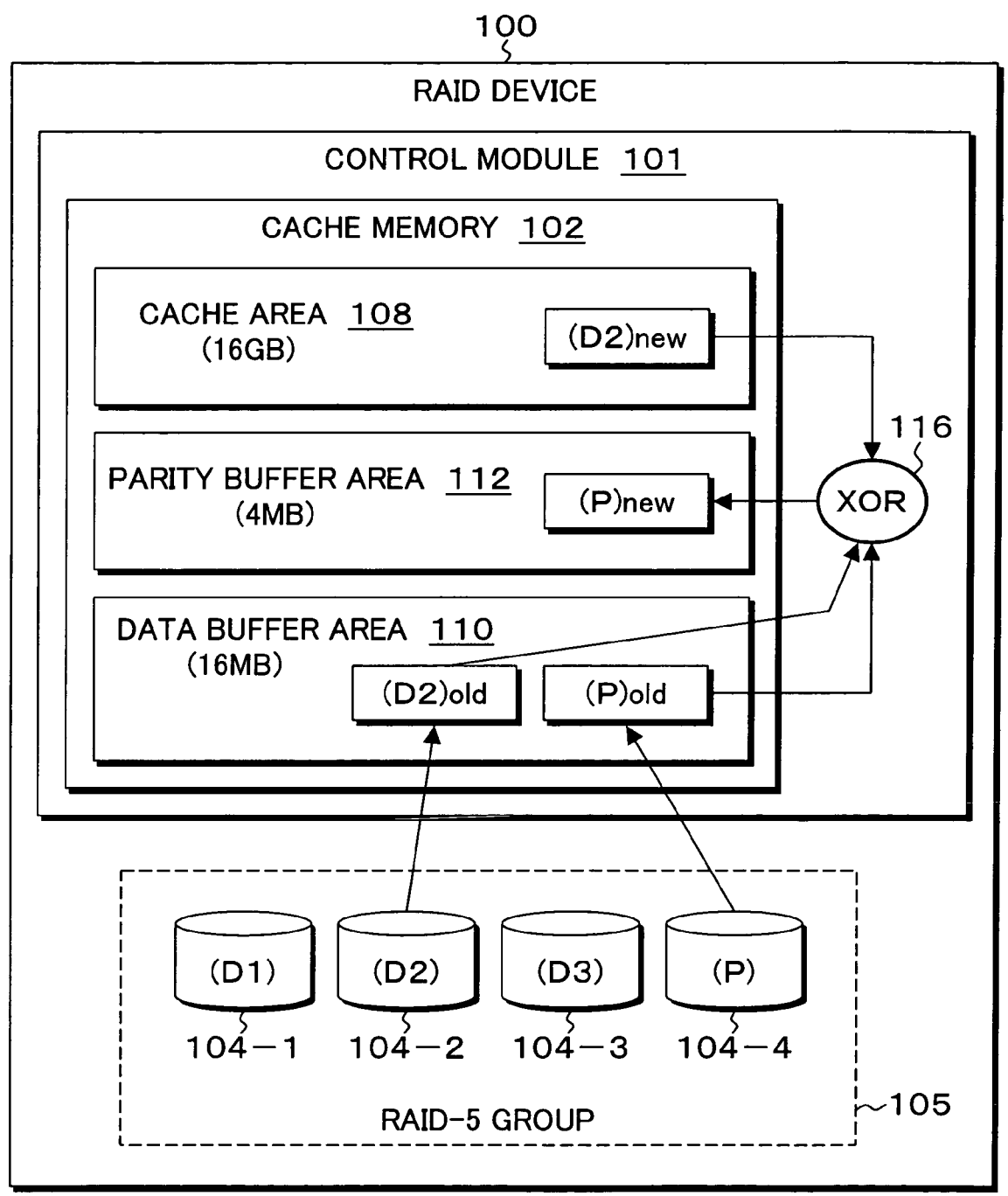
FIG. 1 is an explanatory diagram of a conventional write-back process.
Figure 2:
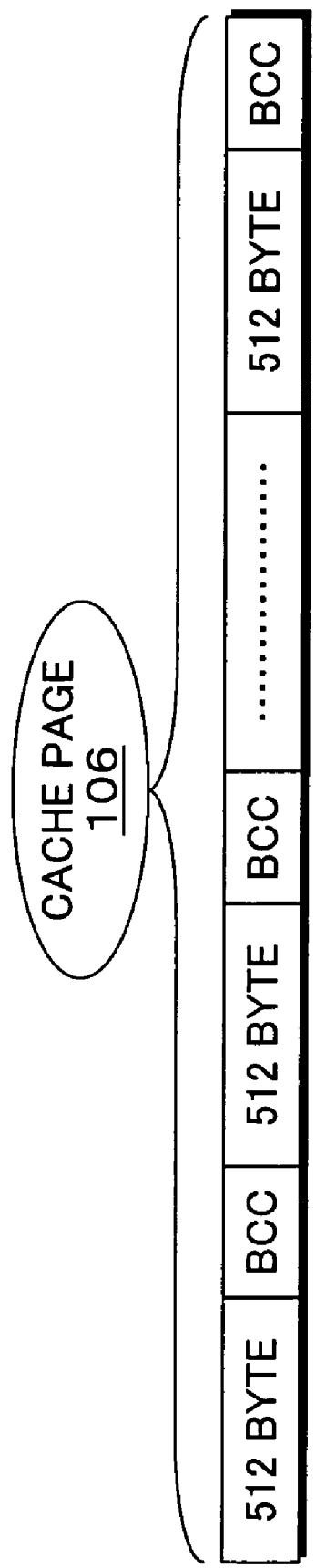
FIG. 2 is an explanatory diagram of a cache page in a conventional system.
Figure 3:
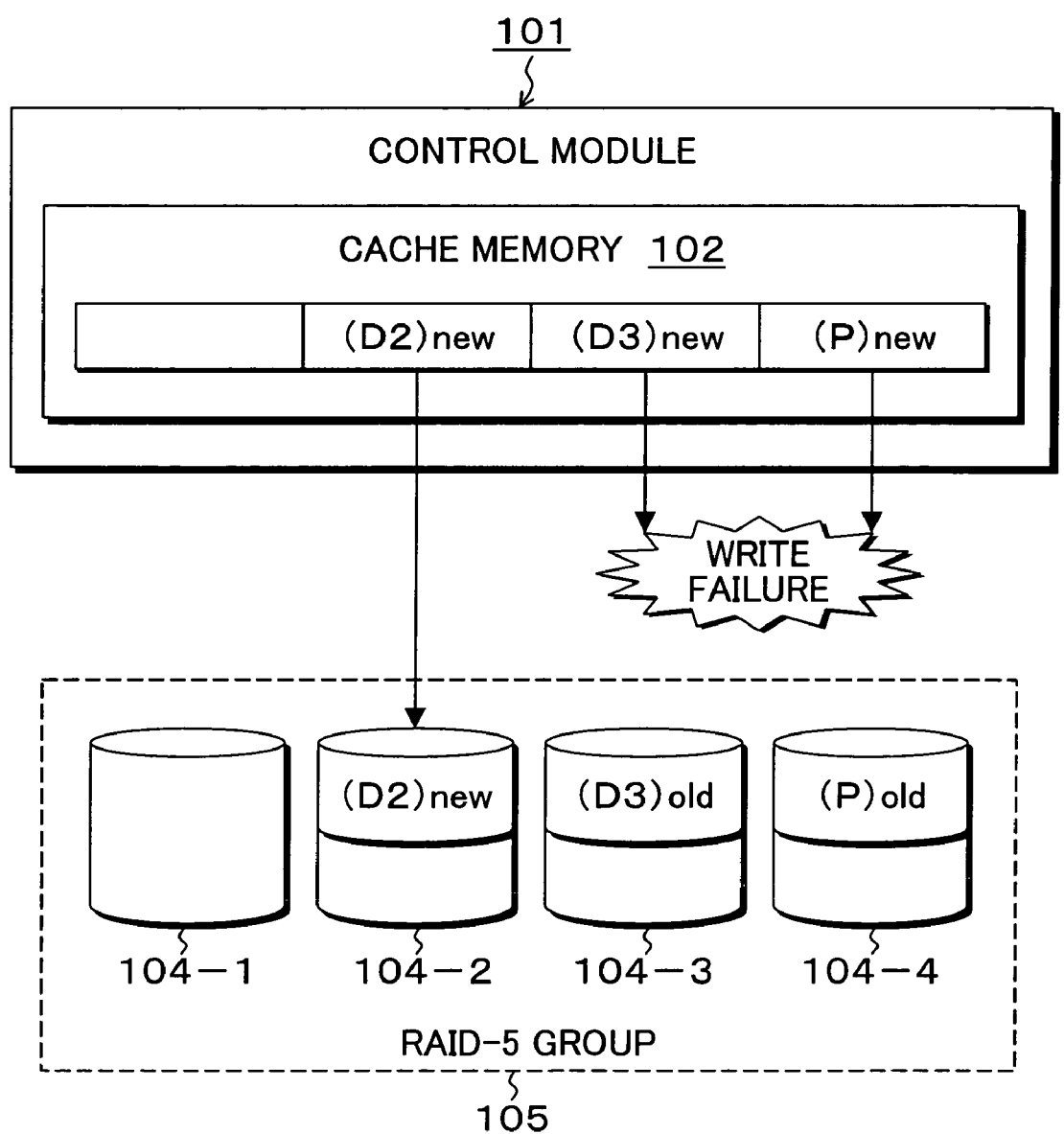
FIG. 3 is an explanatory diagram of a state in which consistency of RAID-5 group is broken in the write-back process.
Figure 4:
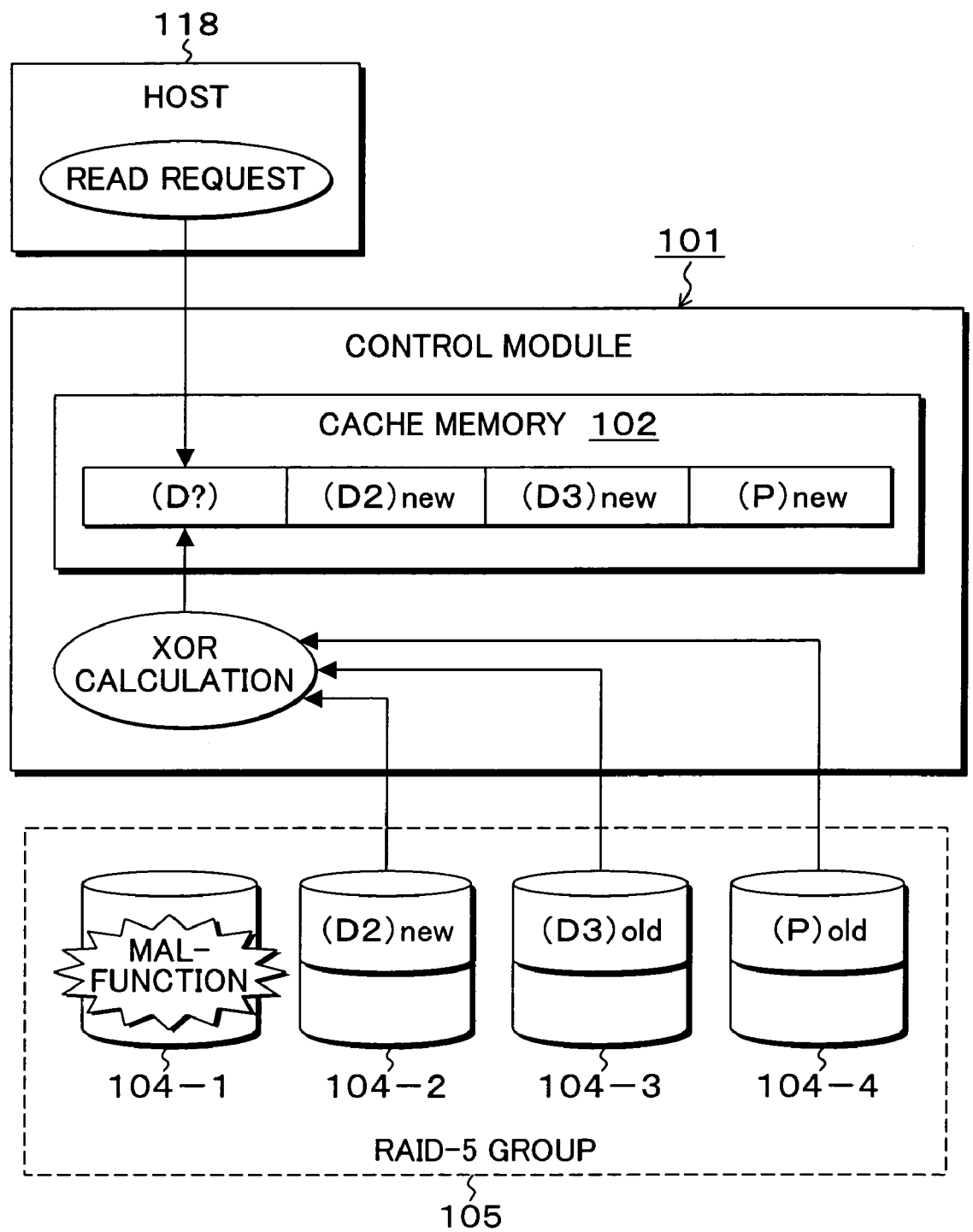
FIG. 4 is an explanatory diagram of a state in which garbled data is generated upon host read request in a state in which consistency of RAID 5 is broken.
Figure 5:
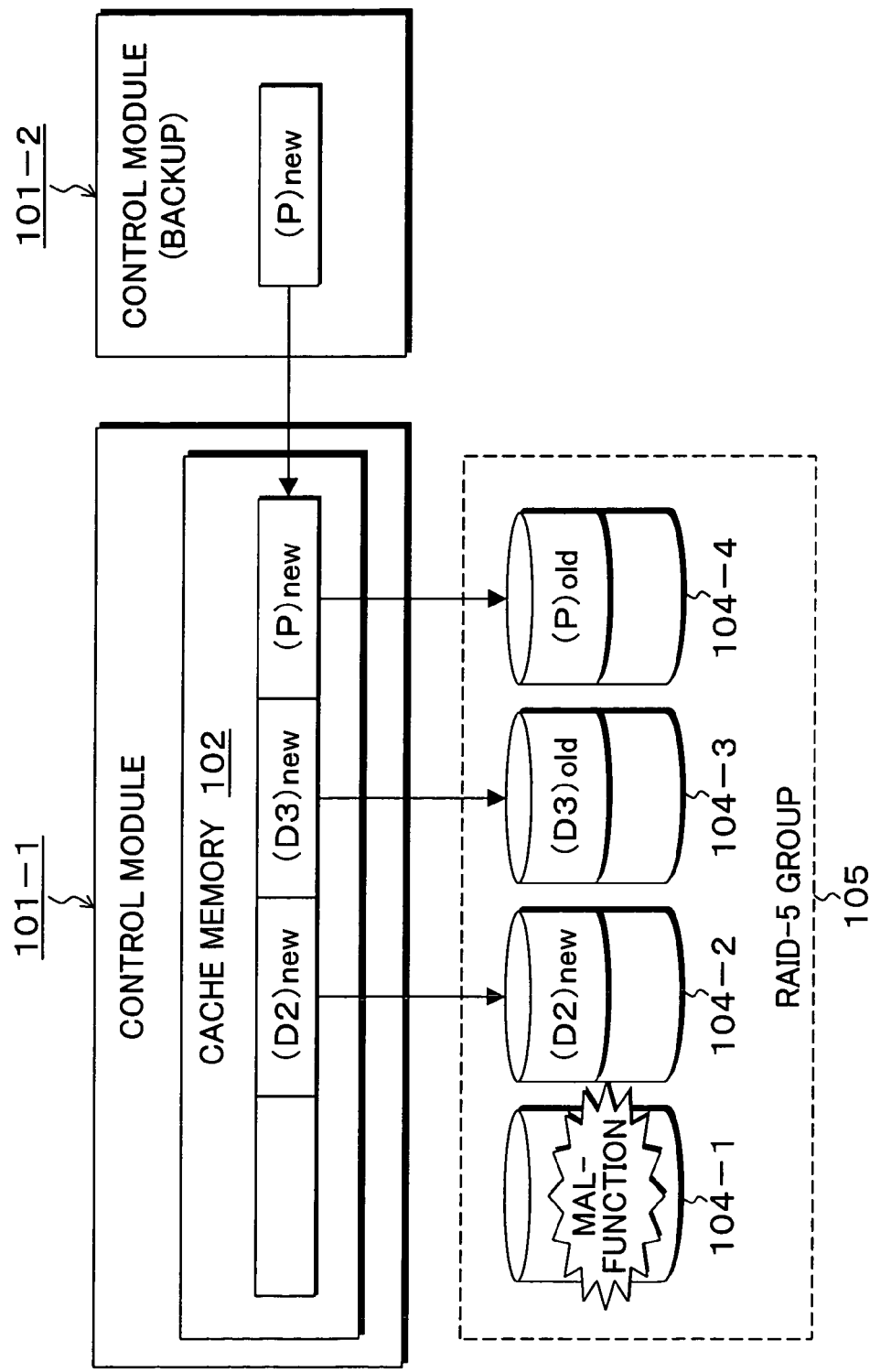
FIG. 5 is an explanatory diagram of a conventional write correction process for recovering consistency by use of saved parity.
Figure 6:
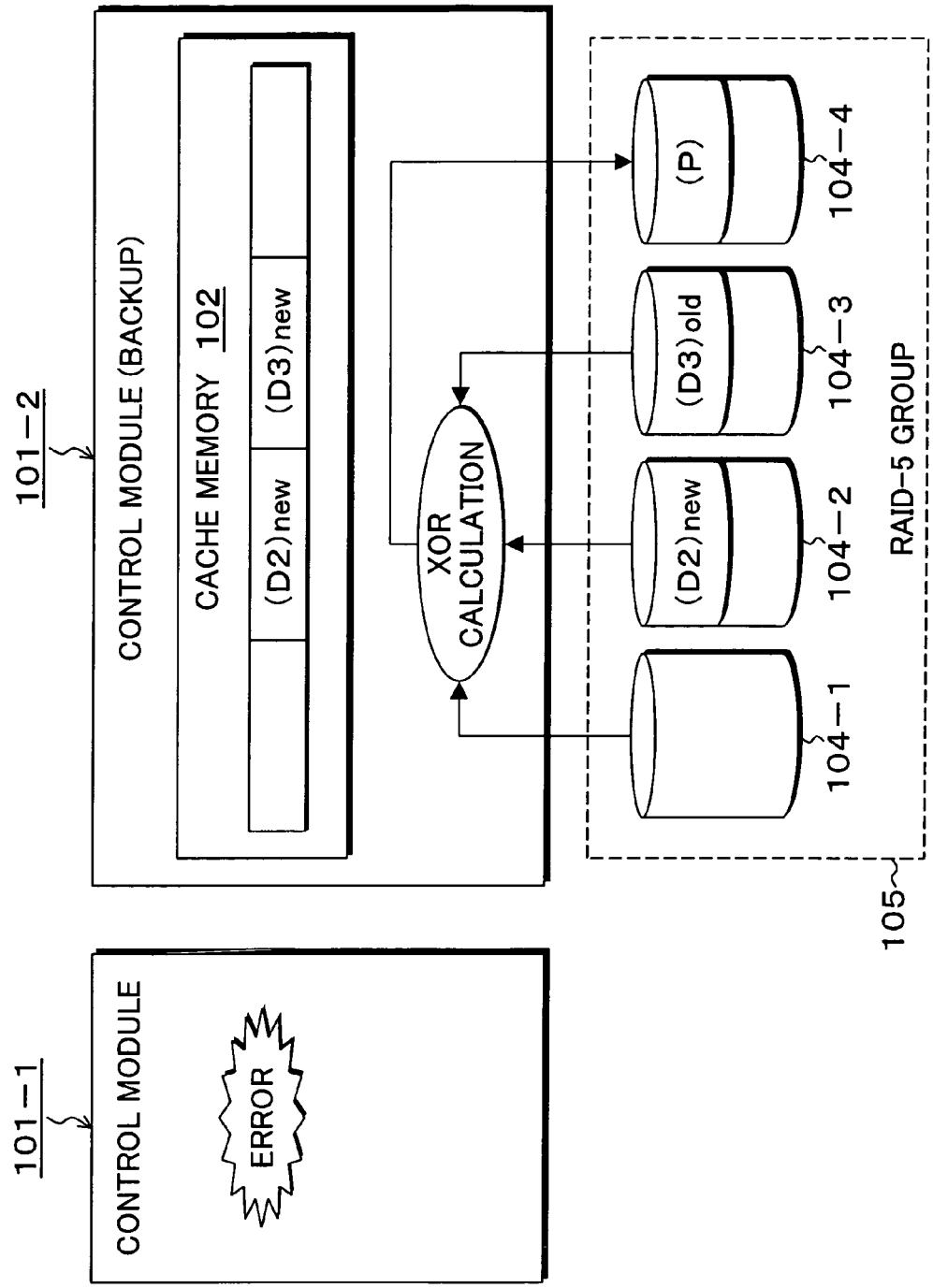
FIG. 6 is an explanatory diagram of a conventional process for recovering consistency from data of RAID 5 when there is no saved parity.
Figure 7:
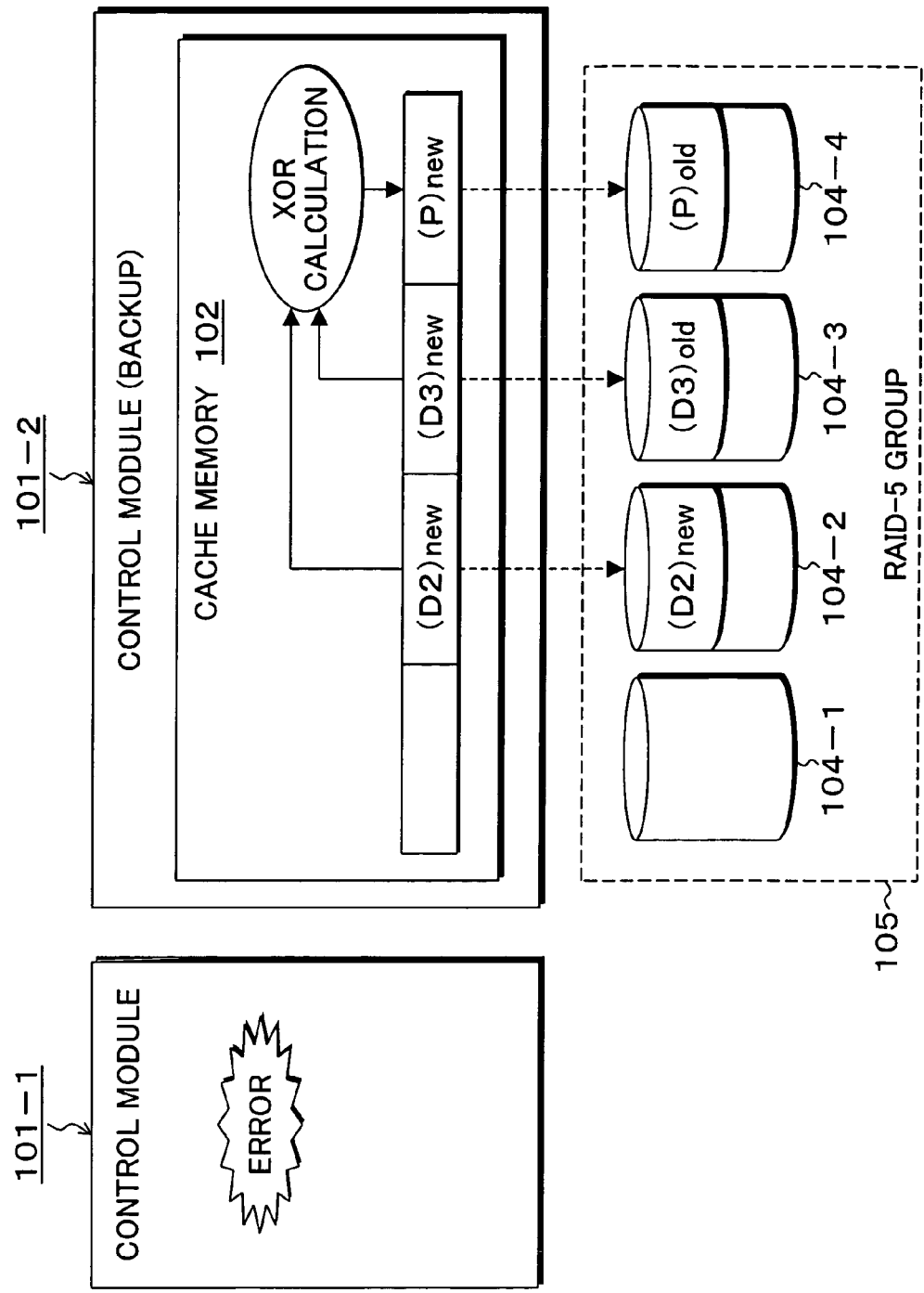
FIG. 7 is an explanatory diagram of a process for writing back new data from a cache, after consistency is recovered in FIG. 6.
Figure 8A:
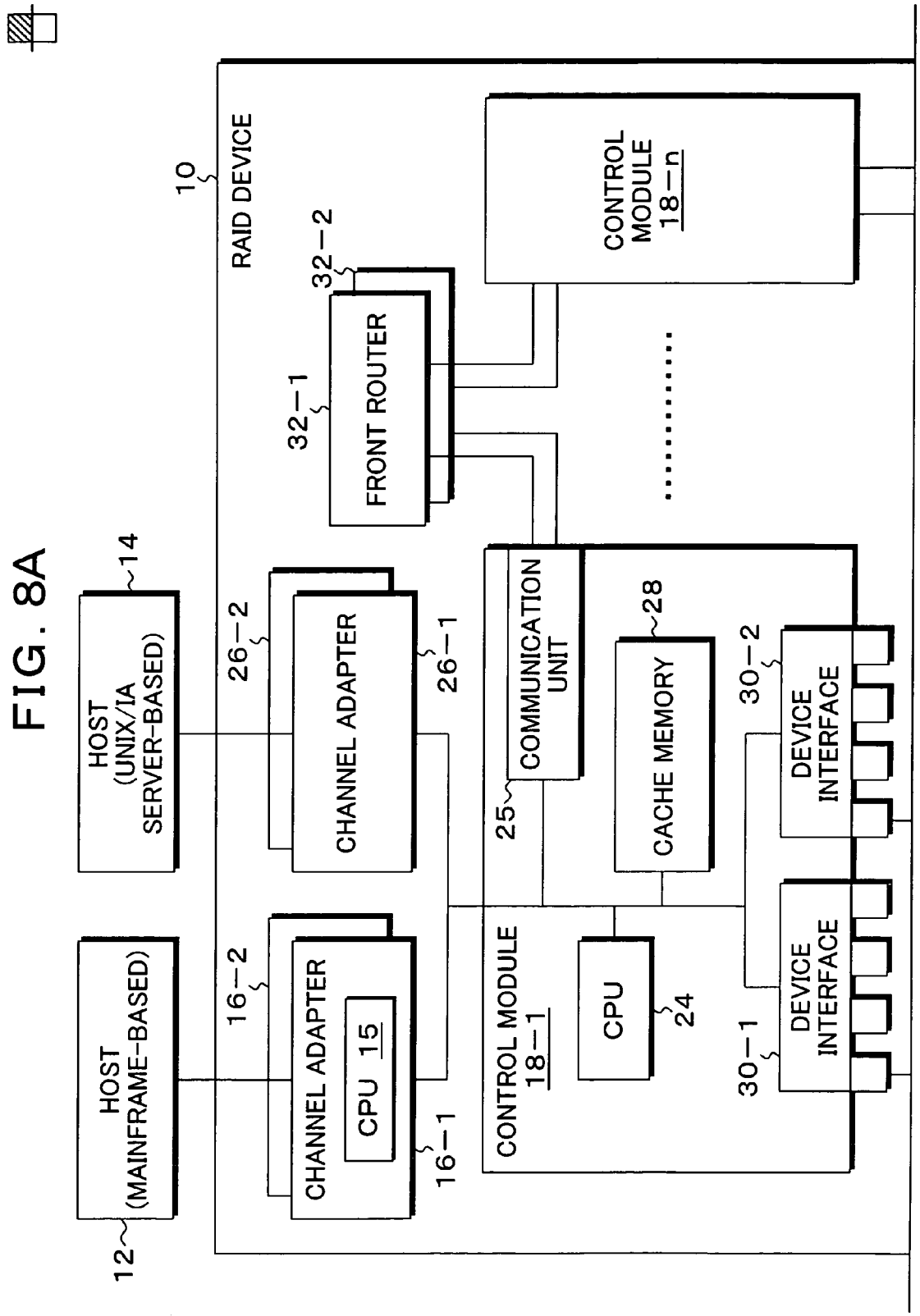
FIGS. 8A and 8B are block diagrams of a hardware configuration of a RAID device to which the present invention is applied.
Figure 8B:
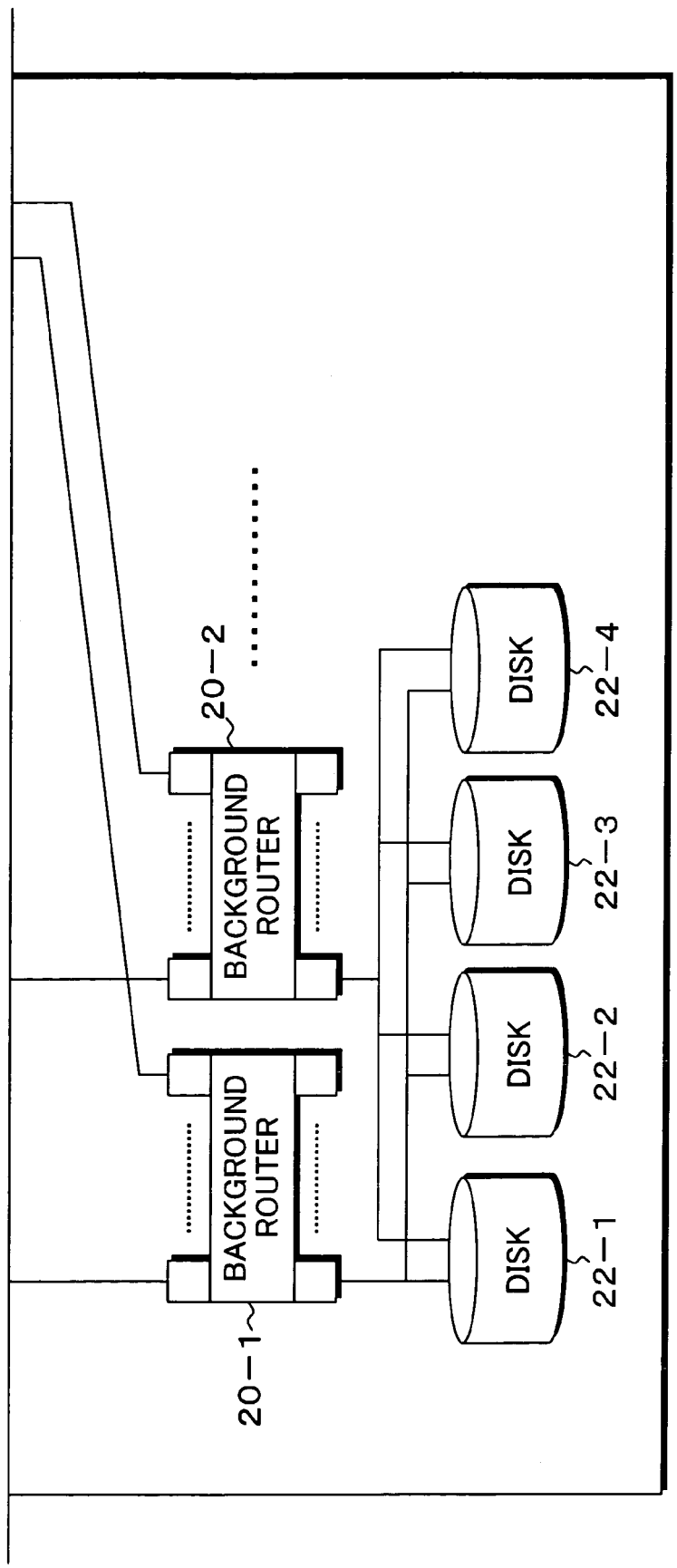

FIGS. 8A and 8B are block diagrams of a hardware configuration of a RAID device to which the present invention is applied, wherein a large-scale constitution of the device is employed as an example. In FIGS. 8A and 8B, a mainframe-based host 12 and a UNIX (R)/IA server-based host 14 are provided with respect to a RAID device 10. In the RAID device 10 provided are channel adapters 16-1 and 16-2 provided with CPUs 15, control modules 18-1 to 18-n, background routers 20-1 and 20-2, disk devices 22-1 to 22-4 such as hard disk drives which serve as storage devices and form a redundant configuration of RAID 5, and front routers 32-1 and 32-2. In a maximum constitution, eight control modules can be mounted on the RAID device 10. The channel adapters 16-1 and 16-2 are provided with the CPUs 15, and connect the framework-based host 12 to the control module 18-1. In addition, channel adapters 26-1 and 26-2 connect the UNIX (R)/IA server-based host 14 to the control module 18-1. The channel adapters 16-1 and 16-2 and the channel adapters 26-1 and 26-2 are connected to other control modules 18-2 (unillustrated) to 18-n, through a communication unit 25 provided in the control module 18-1, and then, via the front routers 32-1 and 32-2. In each of the control modules 18-1 to 18-n, as representatively shown in the control module 18-1, a CPU 24, the communication unit 25, a cache memory 28, and device interfaces 30-1 and 30-2 are provided. The CPU 24 is provided with an input/output processing function for processing an input/output request corresponding to a write command or a read command from the host 12 or the host 14 in the cache memory 28 so as to respond to it, in addition, through program control, performs control and management of the cache memory 28, write-back of cache data to the disk devices 22-1 to 22-4 via the cache memory 28 and then via the background routers 20-1 and 20-2, staging of disk data from the disk devices 22-1 to 22-4, etc. The front routers 32-1 and 32-2 connect other control modules 18-2 (unillustrated) to 18-n to the control module 18-1, thereby multiplexing the control. Each of the control modules 18-1 to 18-n is connected to the background routers 20-1 and 20-2, and performs data input/output processes according to RAID control performed by the CPU 24 in the control module side. Herein, one of the n numbers of control modules 18-1 to 18-n is allotted as a control module for backup.

Figure 9:
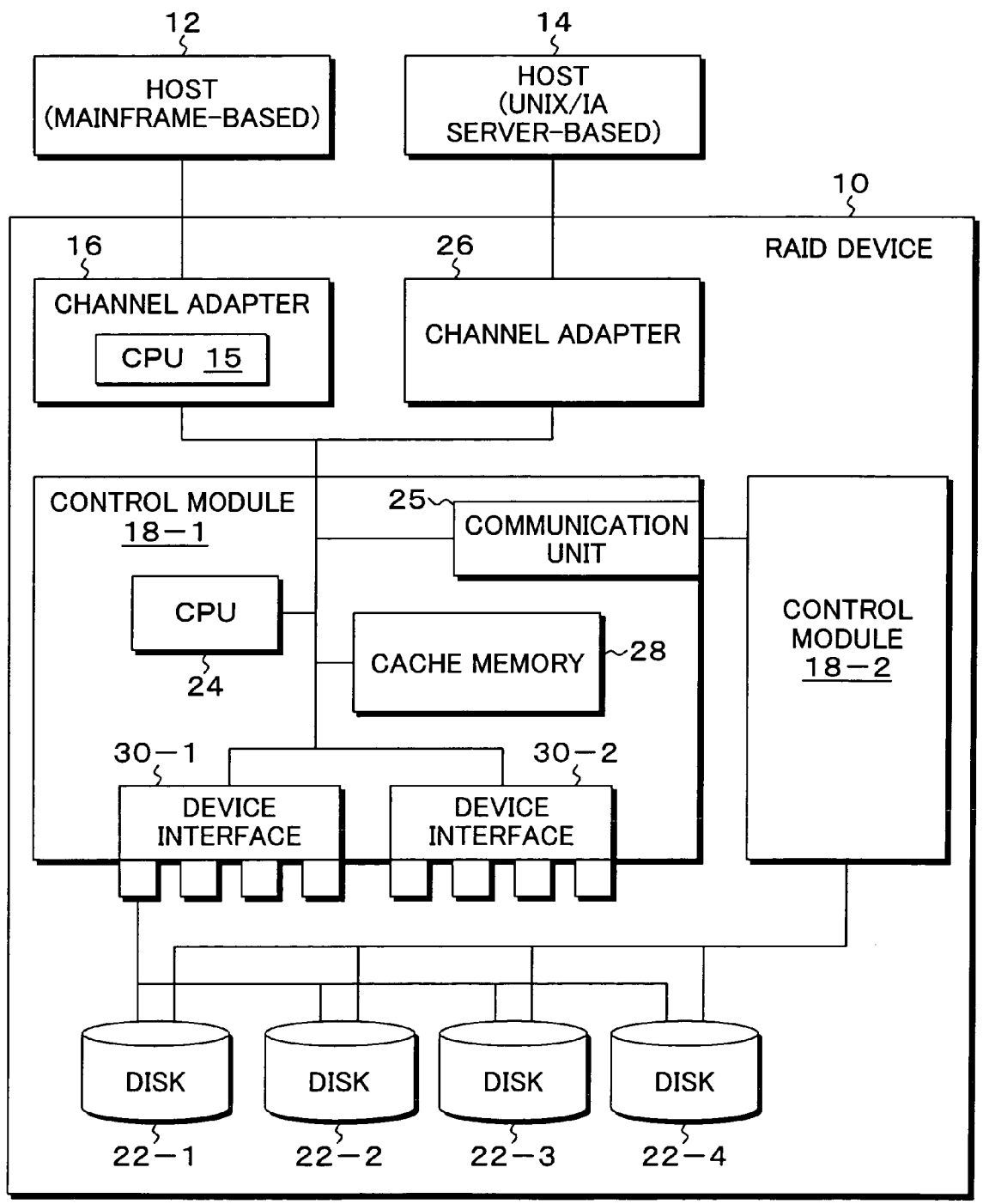
FIG. 9 is a block diagram of another hardware configuration of the RAID device to which the present invention is applied.

FIG. 9 is a block diagram of another hardware configuration of the RAID device to which the present invention is applied, wherein a case of a small size or a medium size device having a small scale compared with the large-scale device of FIGS. 8A and 8B are employed as examples. In FIG. 9, the RAID device 10 is provided with a channel adapter 16 which is provided with the CPU 15, the control modules 18-1 and 18-2 having a duplex configuration, and the disk devices 22-1 to 22-4 forming a redundant configuration of at least RAID 5. Herein, the control module 18-1 is for regular use, and the control module 18-2 is for backup, so as to form a redundant configuration by duplexing. In the control module 18-1 or 18-2, as representatively shown in the control module 18-1, the CPU 24, the communication unit 25, the cache memory 28, and the device interfaces 30-1 and 30-2 are provided. The UNIX (R)/IA server-based host 14 is connected to the control module 18-1 via a channel adapter 26. The RAID device 10 of FIG. 9 corresponding to a small size or a medium size has a small-scale configuration in which the background routers 20-1 and 20-2 and the front routers 32-1 and 32-2 are removed from the RAID device 10 of FIGS. 8A and 8B. Except for this, the configuration is basically same as that of FIGS. 8A and 8B.

Figure 10:
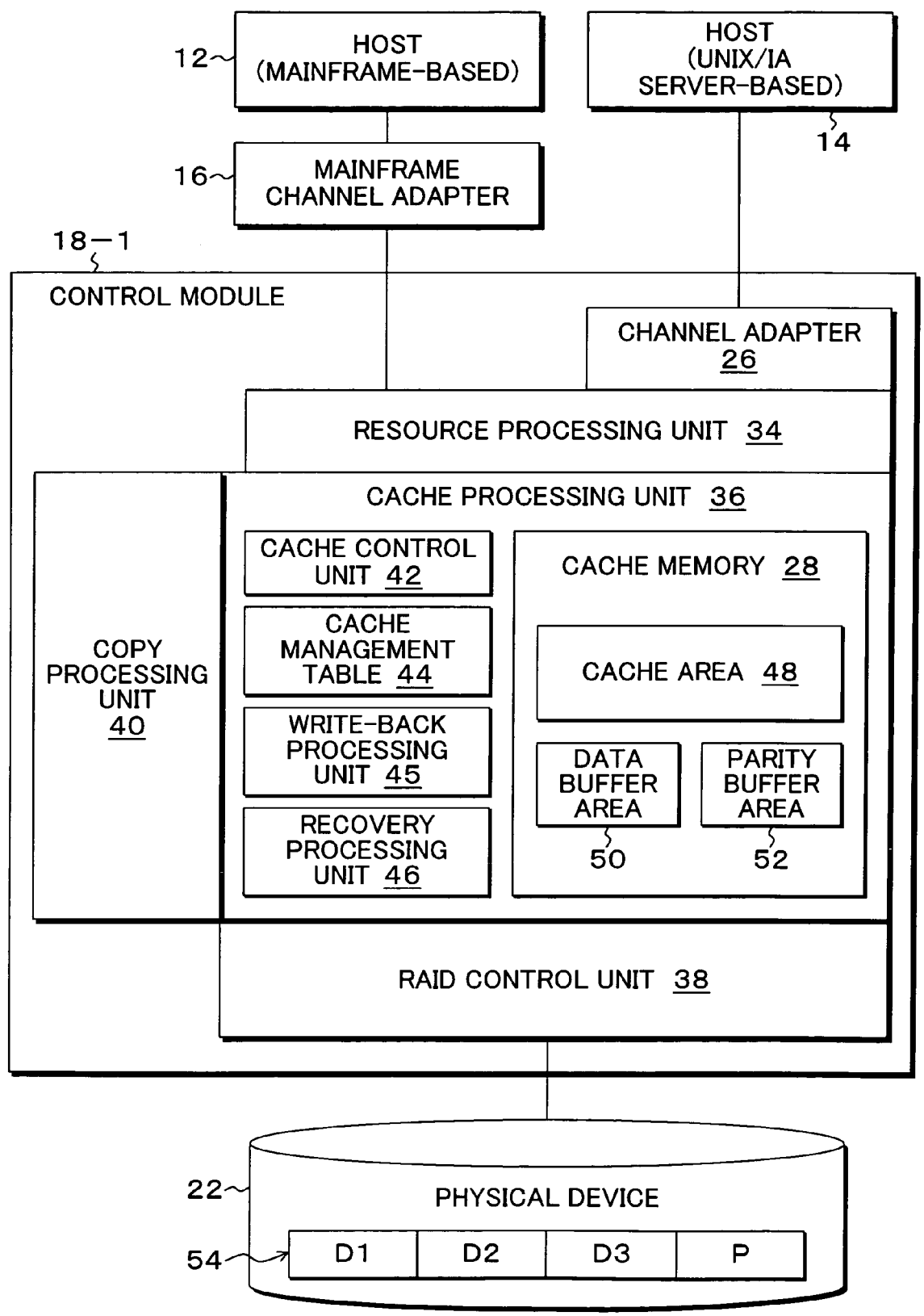
FIG. 10 is a block diagram of a functional configuration of the RAID device according to the present invention.
Figure 11:
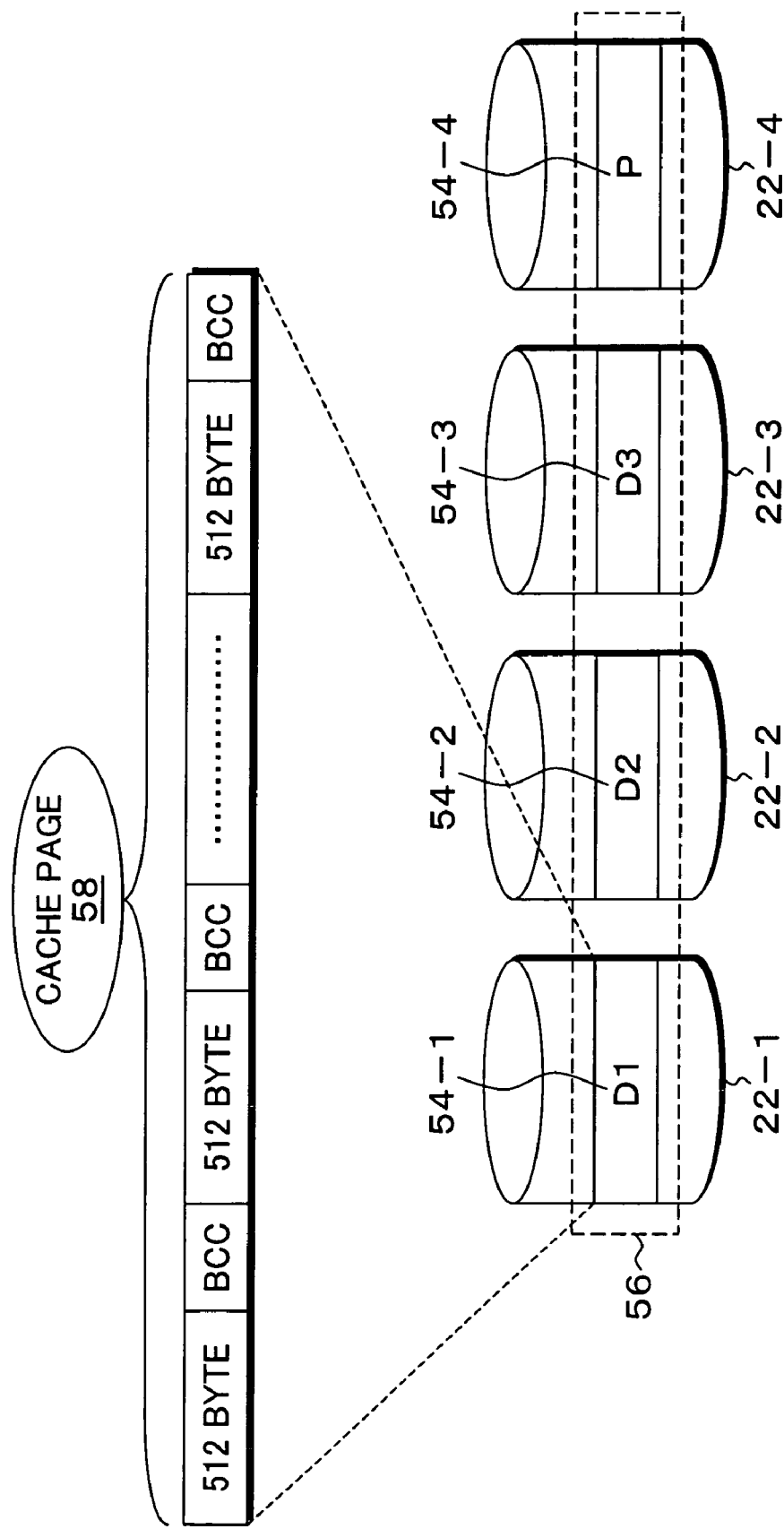
FIG. 11 is an explanatory diagram of a cache page and strip areas and a stripe area of disk devices.
Figure 12:
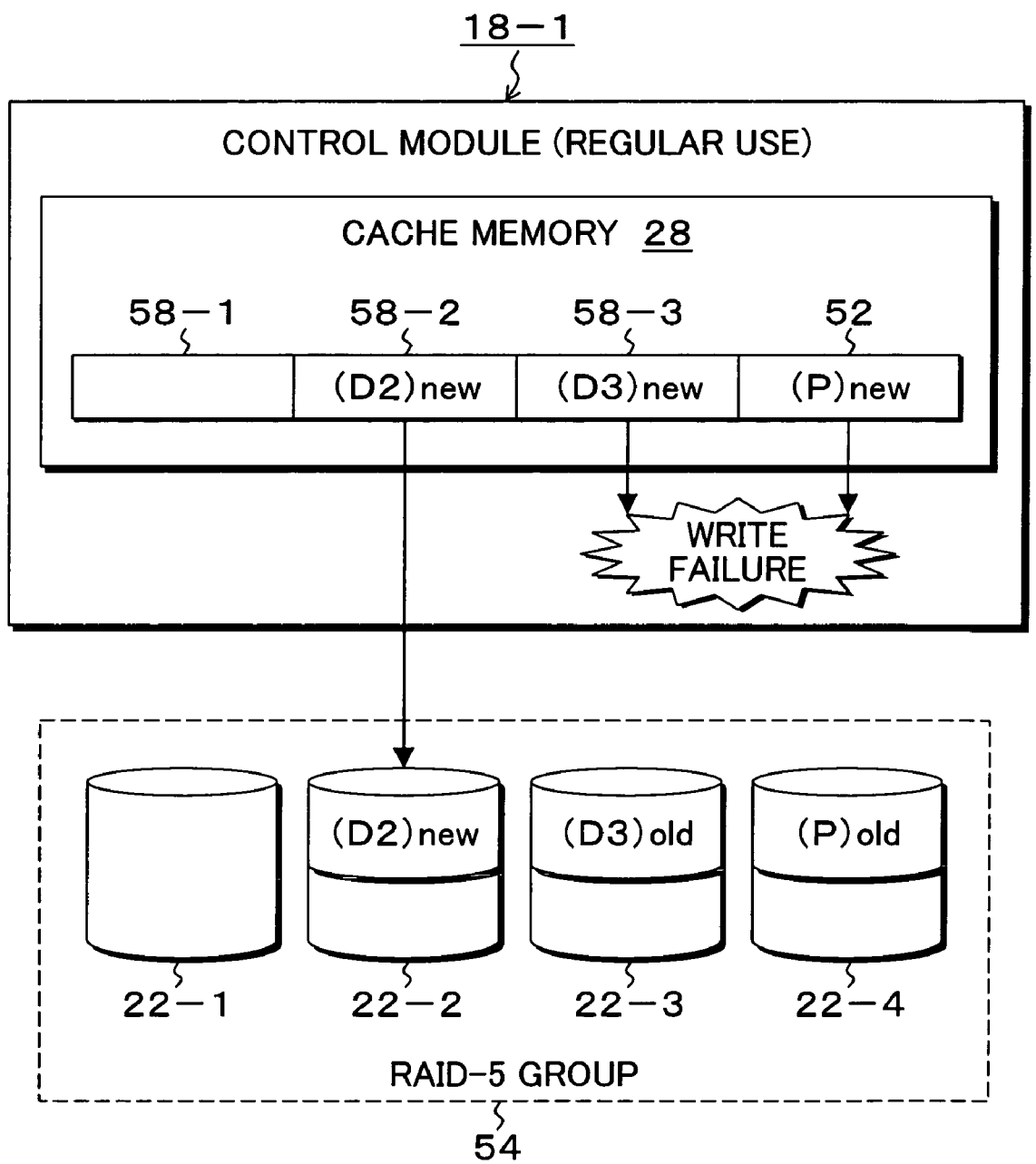
FIG. 12 is an explanatory diagram of a state in which the consistency of the RAID-5 group is broken due to an error occurred in a write-back process.

FIG. 10 is a block diagram of a functional configuration of the RAID device according to the present invention. In FIG. 10, functions of the RAID device 10 are realized by program control performed by the CPU 24 which is provided in the control module 18-1 of FIG. 9, thereby forming, as shown in the control module 18-1, a resource processing unit 34, a cache processing unit 36, a RAID control unit 38, and a copy processing unit 40. In the cache processing unit 36, a cache control unit 42, a cache management table 44, a write-back processing unit 45, a recovery processing unit 46, and a cache memory 28 are provided. In the cache memory 28 provided are a cache area 48 which is placed when a write request from the host 12 or the host 14 is received so as to write data therein, a data buffer area 50 which is placed in a write-back process for writing cache data which is in the cache area 48 to the disk device of a RAID-5 group 54 which is represented by a physical device 22, and a parity buffer area 52. The cache control unit 42 manages the data in the cache memory 28 in page area units, and processes input/output requests of the host 12 or the host 14 with respect to the physical device 22 which forms a RAID group by a plurality of disk devices. That is, the cache control unit 42 forms, as shown in FIG. 11, one page as a cache page 58 by 66,560 bytes including 128 blocks of 520-byte block data, which is an access unit from the host side, comprising 512-byte user data and 8-byte BCC. Such cache pages 58 in the cache memory 28 are recorded and managed in the cache management table 44 in page units, and the record in the cache management table 44 comprises, for example, a logical unit number (LUN), a logical block address (LBA), and a dirty data bitmap (128 bit) in which blocks comprising new data are represented by bits. Referring again to FIG. 10, the RAID control unit 38 performs RAID control according to a redundant configuration of RAID 5 in the present invention on the physical device 22 constituting a RAID-5 group 54 by a plurality of disk devices. That is, the RAID control unit 38, as shown in the disk devices 22-1 to 22-4 of FIG. 11, manages the data in the disk devices 22-1 to 22-4 as strip areas 54-1, 54-2, 54-3, and 54-4, respectively, each of which having the same size as the cache page 58 which is in the cache memory 28, and manages the plurality of strip areas 54-1 to 54-4 having the same address collectively as a stripe area 56. In a case of a redundant configuration of RAID 5, for example, in a case of the stripe area 56, data D1, D2, and D3 are stored in the strip areas 54-1 to 54-3 of the disk devices 22-1 to 22-3, respectively, and parity P is stored in the strip area 54-4 of the remaining disk device 22-4. In the case of a redundant configuration of RAID 5, the position of the disk which stores the parity P changes every time the address of the stripe area 56 is changed. Referring again to FIG. 10, when a write-back request for writing back new data (dirty data) in the cache memory 28 to the disk devices 22-1 to 22-4 is generated, the write-back processing unit 45 reserves the parity buffer area 52 in the cache memory 28 and generates new parity, and then, writes the new data and the new parity to the corresponding disk devices. When an error in which the consistency of the RAID-5 group 54 is broken occurs upon write performed by the write-back processing unit 45, the recovery processing unit 46 reserves, in the cache memory 28, a cache stripe area storing the data of the entire stripe, including the new data, which is to be written back, and causes the cache control unit 42 to manage it. In addition, at this point, it causes the write-back processing unit 45 to release the parity buffer area 52 storing the new parity. Herein, when errors occur in two or more storage devices upon write performed by the write-back processing unit 45, the recovery processing unit 46 determines that an error in which the consistency of the RAID-5 group 54 is broken has occurred. The error in which the consistency is broken is, for example, the case in which, write to the disk devices in a write-back process fails due to an error of the control module 18-1 (degeneration of the control modules), and then, a disk device(s) malfunctions due to failure or the like (degeneration of RAID 5). Since the cache stripe area reserved by the recovery processing unit 46 in the cache retains, in the cache, the correct data of the entire stripe area of the RAID-5 group of which consistency has been broken, when an unused page(s) is present, new data obtained through exclusive OR of the new data which is in the same area and the new parity in the parity buffer area 52 is staged to the unused page area. In this case, since the unused area is not always in a page unit, the unused area may present even after staging the new data which has been obtained through exclusive ORing. In this case, data read out from the disk device is staged to the unused area. When staging of the data from the disk device to the unused area in the cache stripe area further fails, the cache stripe area is designated as an access restricted area serving as a Pinned Stripe, and the cache control unit 42 is caused to manage it. The processes of the cache control unit 42 and the write-back processing unit 45 with respect to the cache stripe area, which has been designated as the access restricted area, according to the access restriction are as the following. (1) When read is requested from a host, the cache control unit 42 subjects hit data to read response upon cache hit, and, upon cache miss hit, performs read response upon cache hit after executing the staging prohibiting data recovery, which is based on the redundant configuration of RAID 5, from the disk devices 22-1 to 22-4, i.e., prohibiting regeneration read. (2) When write is requested from a host, the cache control unit 42 writes write-data to the corresponding area. This is same as normal cache control. (3) When a write-back request of a cache stripe area is generated according to, for example, LRU control, the write-back processing unit 45 executes, to the unused area in the cache stripe area, staging prohibiting data recovery, which is based on the redundant configuration of RAID 5, from the disk devices, i.e., prohibiting regeneration read, thereby reserving the data of the entire stripe, and, when it can be reserved, reserves the parity buffer area 52 in the cache memory 28 and generates new parity data from the data of the entire stripe, and then, executes band-wide write for writing the new data and the new parity to the corresponding disk devices. Next, a process performed by the recovery processing unit 46 of the present invention will be described in detail by employing, as an example, the case in which the control module of FIG. 9 is duplexed. FIG. 12 is an explanatory diagram of a state in which the consistency of the RAID-5 group is broken due to an error occurred in a write-back process.

In FIG. 12, if the new data (D2) new and (D3) new in cache pages 58-2 and 58-3 corresponding to a stripe which is managed in the cache memory 28 of the control module 18-1 is to be written back, the data buffer area 50 is reserved in the cache memory 28, the old data (D1) old having the same address of a stripe as the new data (D2) new and (D3) new is read out from the disk device 22-1 so as to stage it, and then, the parity buffer area 52 is reserved. Next, an exclusive OR of the old data (D1) old, the new data (D2) new, and the new data (D3) new is calculated, thereby obtaining new parity (P) new, and it is stored in the parity buffer area 52. Then, a process of writing the new data (D2) new, the new data (D3) new, and the new parity (P) new to the corresponding disk devices 22-2, 22-3, and 22-4, respectively, is executed. However, in such write-back process, if write to the disk devices 22-3 and 22-4 fails due to, for example, an error of the device interface 30-1, which is shown in FIG. 9, in the control module 18-1, merely the disk device 22-2 is rewritten to the new data (D2) new, and the disk devices 22-3 and 22-4 remain to keep the old data (D3) old and the old parity (P1) old. Therefore, the consistency of the stripe which is subjected to write back in the RAID-5 group 54 is broken. Meanwhile, according to an error of the control module 18-1, for example, when the control module 18-2 shown in FIG. 9 is present as a backup, the cache control is transferred from the control module 18-1 to the control module 18-2, thereby degenerating the control modules.

Figure 13:
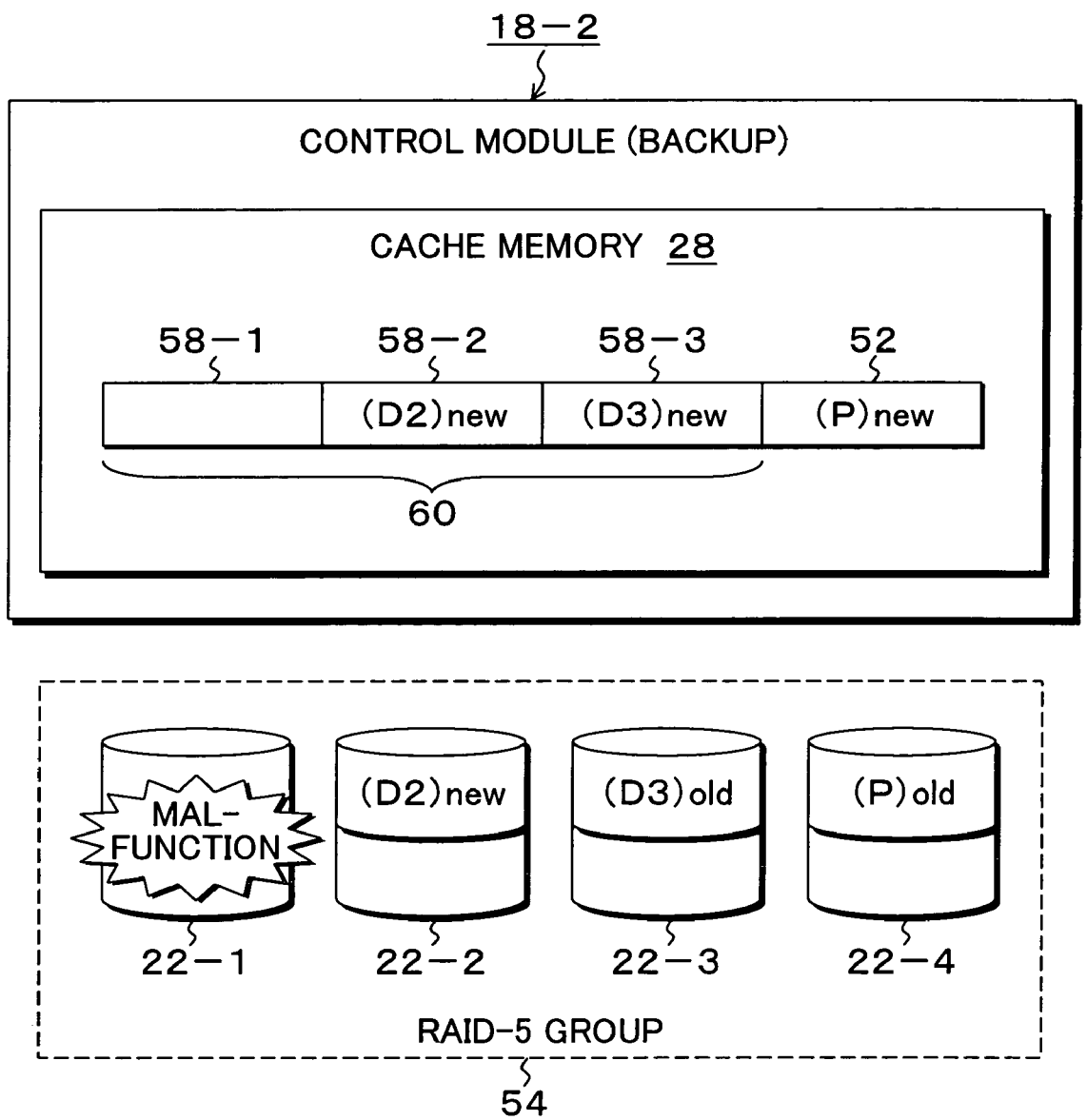
FIG. 13 is an explanatory diagram of a state in which a disk device malfunctions in the error state of FIG. 12 and the RAID-5 group is degenerated.
Figure 14:
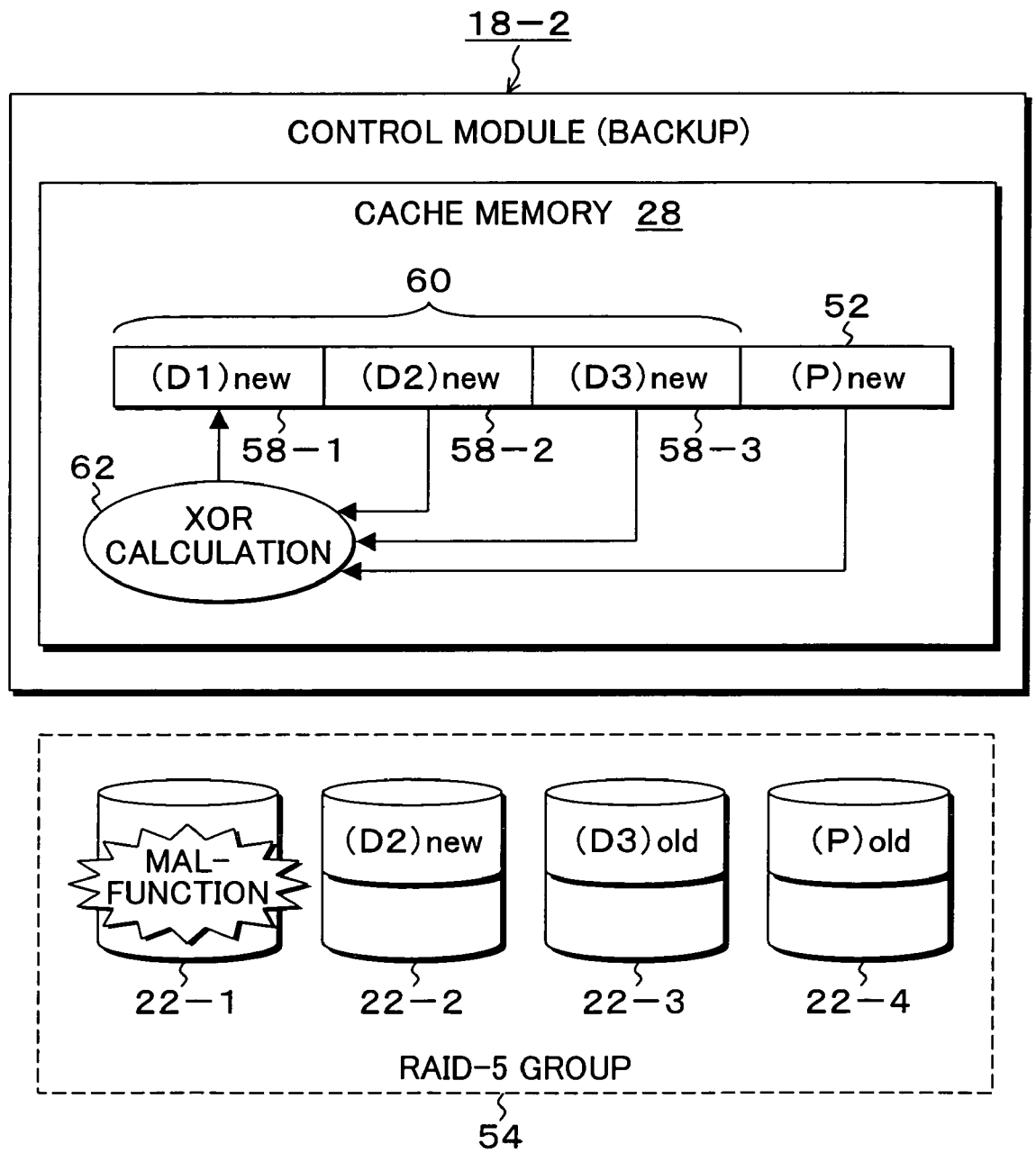
FIG. 14 is an explanatory diagram of a recovery process of the present invention for reserving a cache stripe area of a correct data configuration in a cache memory.
Figure 15:
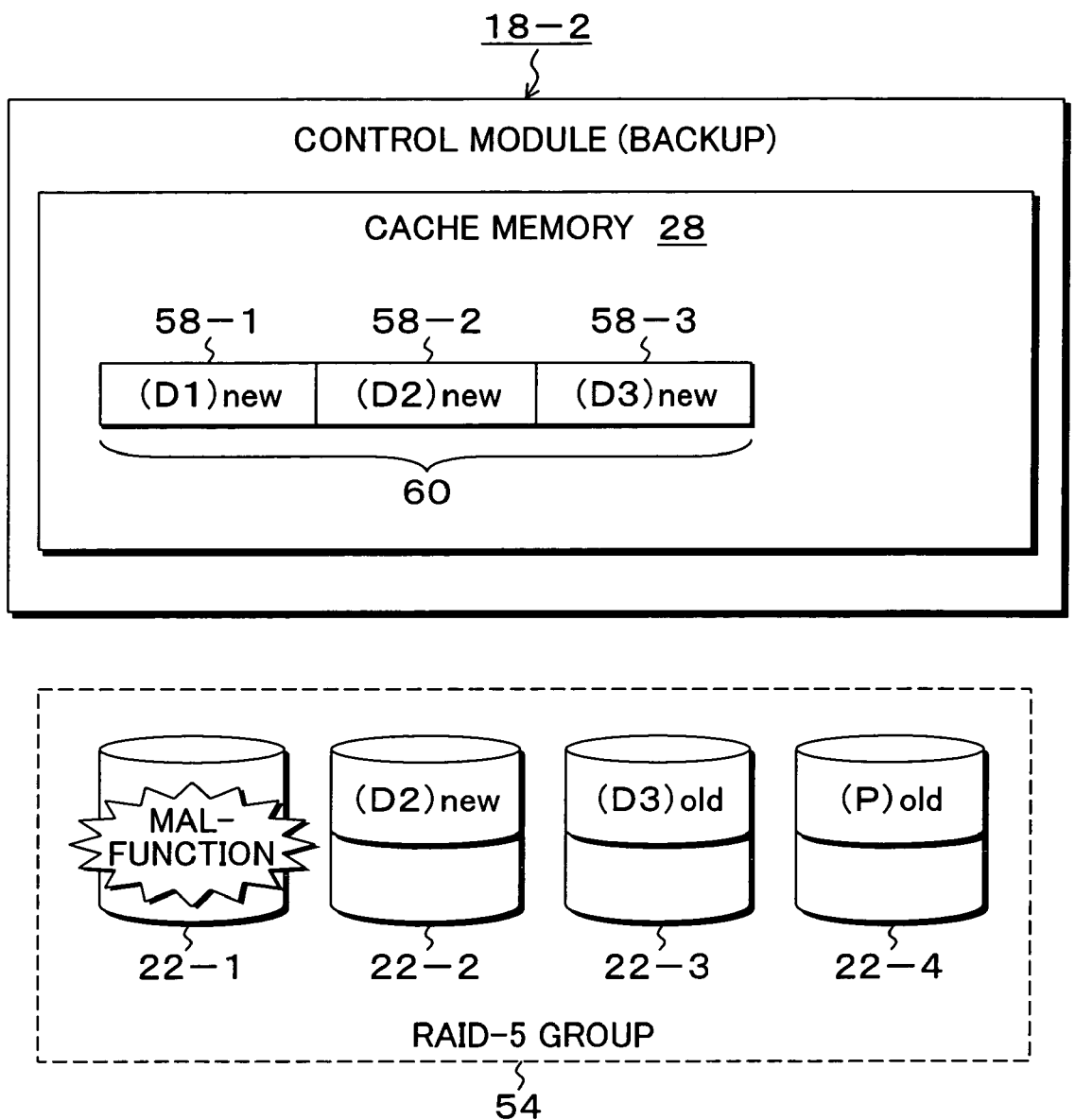
FIG. 15 is an explanatory diagram of a state, subsequent to FIG. 14, in which a parity buffer area is released.
Figure 16:
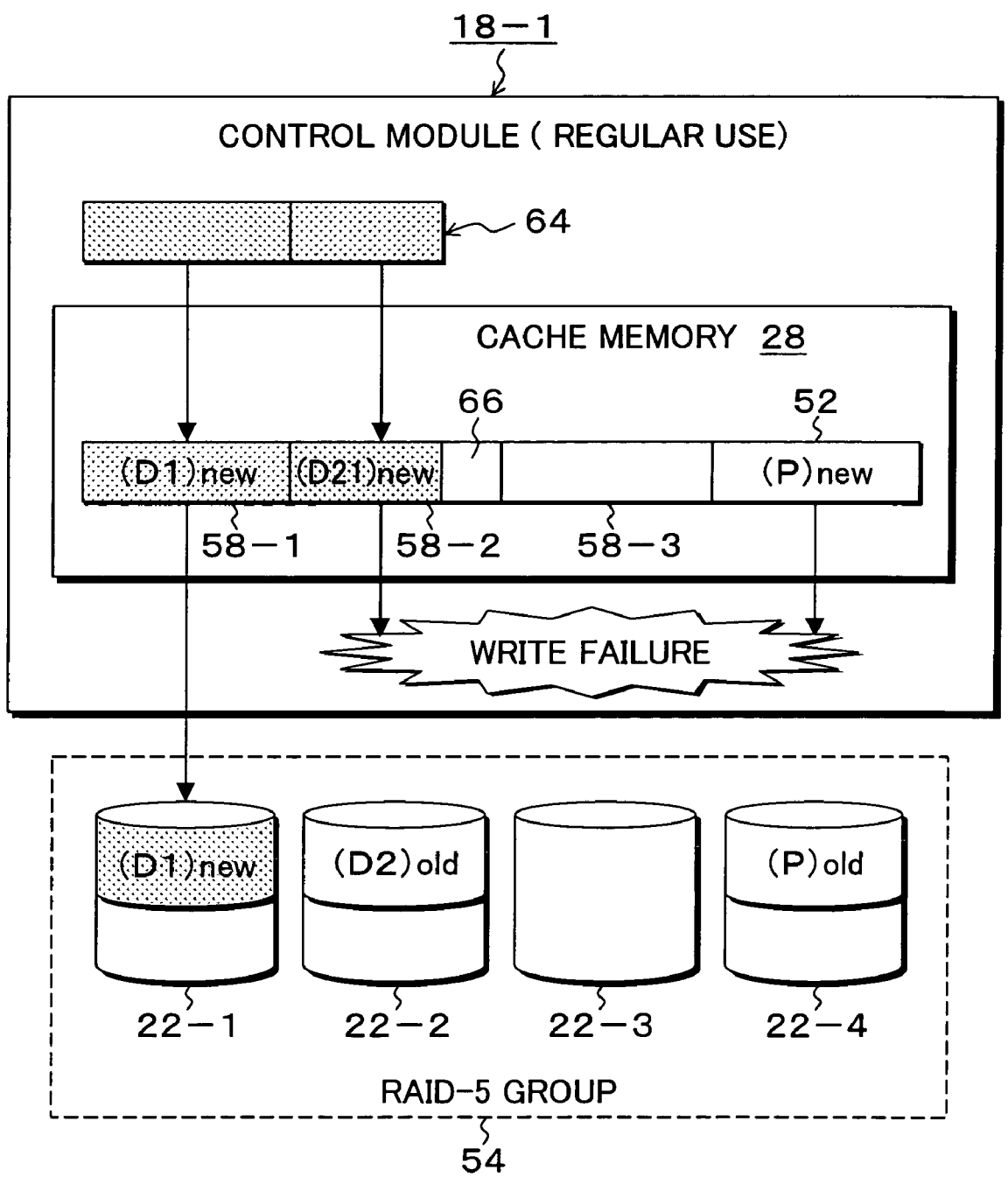
FIG. 16 is an explanatory diagram of a state in which an error which breaks the consistency of the RAID-5 group occurs in write back of the cache area which is performed in response to a write request from a host.

FIG. 13 shows a control module degenerated state after control is transferred, due to the error of the control module 18-1, to the control module 18-2 which has been provided as a backup, and a state in which the RAID-5 group 54 is degenerated, in addition to the above described state, due to malfunction such as failure occurred in the disk device 22-1 provided in the RAID-5 group 54. When, in a state in which the consistency of the RAID-5 group 54 is broken, the disk device 22-1 serving as one device of the group further malfunctions, thereby causing degeneration, in the present invention, all data of the stripe area, i.e., a cache stripe area 60 comprising three pages of cache pages 58-1, 58-2, and 58-3 is reserved in the cache memory 28 of the control module 18-2, and the new data (D2) new and the new data (D3) new which is to be written back is stored in the cache pages 58-2 and 58-3. In addition, the new parity (P) new stored in the parity buffer area 52 is not released, but retained. Next, in the manner of FIG. 14, the recovery processing unit 46 performs calculation of exclusive OR by an operation unit 62 based on the new data (D2) new and the new data (D3) new stored in the cache stripe area 60 and the new parity (P) new stored in the parity buffer area 52, so as to stage the new data (D1) new to the cache page 58-1 which is an unused page corresponding to the malfunctioned disk 22-1. Therefore, in the cache stripe area 60 reserved in the cache memory 28, all data of the stripe of which consistency is broken in the RAID-5 group 54 can be reserved as new data (dirty data), i.e., correct data. When the cache stripe area 60 storing the correct data of the entire stripe area in the RAID-5 group 54 of which consistency has been broken is reserved in the cache memory 28 in the above described manner, as shown in FIG. 15, the recovery processing unit 46 causes the write-back processing unit 45 to release the parity buffer area 54 storing the new parity (P) new. As a result, the cache stripe area 60 storing the correct data correspondingly to the stripe in the RAID-5 group 54 of which consistency has been broken is reserved in the cache memory 28, the cache control unit 42 executes a process on the cache stripe area 60 for an access from a host, and, when write-back conditions according to, for example, LRU are fulfilled, the write-back processing unit 45 executes a write-back process. As a matter of course, the write back by the write-back processing unit 45 is performed, for example, when LRU conditions are fulfilled after the malfunctioned disk device 22-1 in the RAID-5 group 54 is replaced by a normal disk device and the error is recovered. In this case, new data is reserved in the entire cache stripe area 60 and no unused area is left, therefore, access restriction is not carried out, and cache control for input/output requests from the hosts is performed in the exactly same manner as that of a normal cache area. Since all the correct new data corresponding to the corresponding stripe of the RAID-5 group 54 is reserved in the cache stripe area 60, read requests from upper-level devices always result in cache hit, and staging from the disk devices 22-1 to 22-4 of the RAID-5 group 54 of which consistency has been broken is not performed; therefore, staging of the data of the stripe of which consistency has been broken, regeneration read for recovering the data of the failure disk by exclusive OR of other disks, etc. are not performed at all, and, as a result, data garbling due to staging from the disk devices of the RAID-5 group 54 of which consistency has been broken can be completely prevented. Next, a process of a case in which unused areas are present in the cache stripe area which has been reserved in the cache memory by the recovery processing unit will be explained. FIG. 16 is an explanatory diagram of a state in which an error which breaks the consistency of the RAID-5 group has occurred in write back of the cache area which is performed in response to a write request from a host.

In FIG. 16, the control module 18-1 operates for regular use, and when it receives a request, from a host, for writing write data 64, the write data 64 is written over the old data of the cache pages 58-1 and 58-2 which are managed in the cache memory 28, thereby providing new data (D1) new and the new data (D2) new. Herein, in the cache page 58-2, the write data 64 does not occupy the entire page but is partial write data; therefore, for example, an unused area 66 is generated after write of the write data 64. When the write-back conditions according to, for example, LRU are fulfilled after such write data 64 is written to the cache memory 28, new parity (P) new is calculated through exclusive OR of the data of the cache pages 58-1, 58-2, and 58-3 and stored in the parity buffer area 52, and then, the new data (D1) new, new data (D21) new which is a part of the cache page 58-2, and the new parity (P) new is written to the corresponding disk devices 22-1, 22-2, and 22-4 of the RAID-5 group 54, respectively. At this point, if, for example, write to the disk device 22-2 and the disk device 22-4 fails due to an error of, for example, the device interface in the control module 18-1, the new data (D1) new is written to only the disk device 22-1, and the disk device 22-2 and the disk device 22-4 remain to keep the old data (D2) old and the old parity (P) old, respectively, thereby breaking the consistency of the data of the stripe of the RAID-5 group 54 which is to be subjected to write back. Since an error has occurred in the control module 18-1 in the write-back process due to failure of, for example, the device interface, control is transferred to the control module 18-2 which is ready as a backup, thereby degenerating the control modules.

Figure 17:
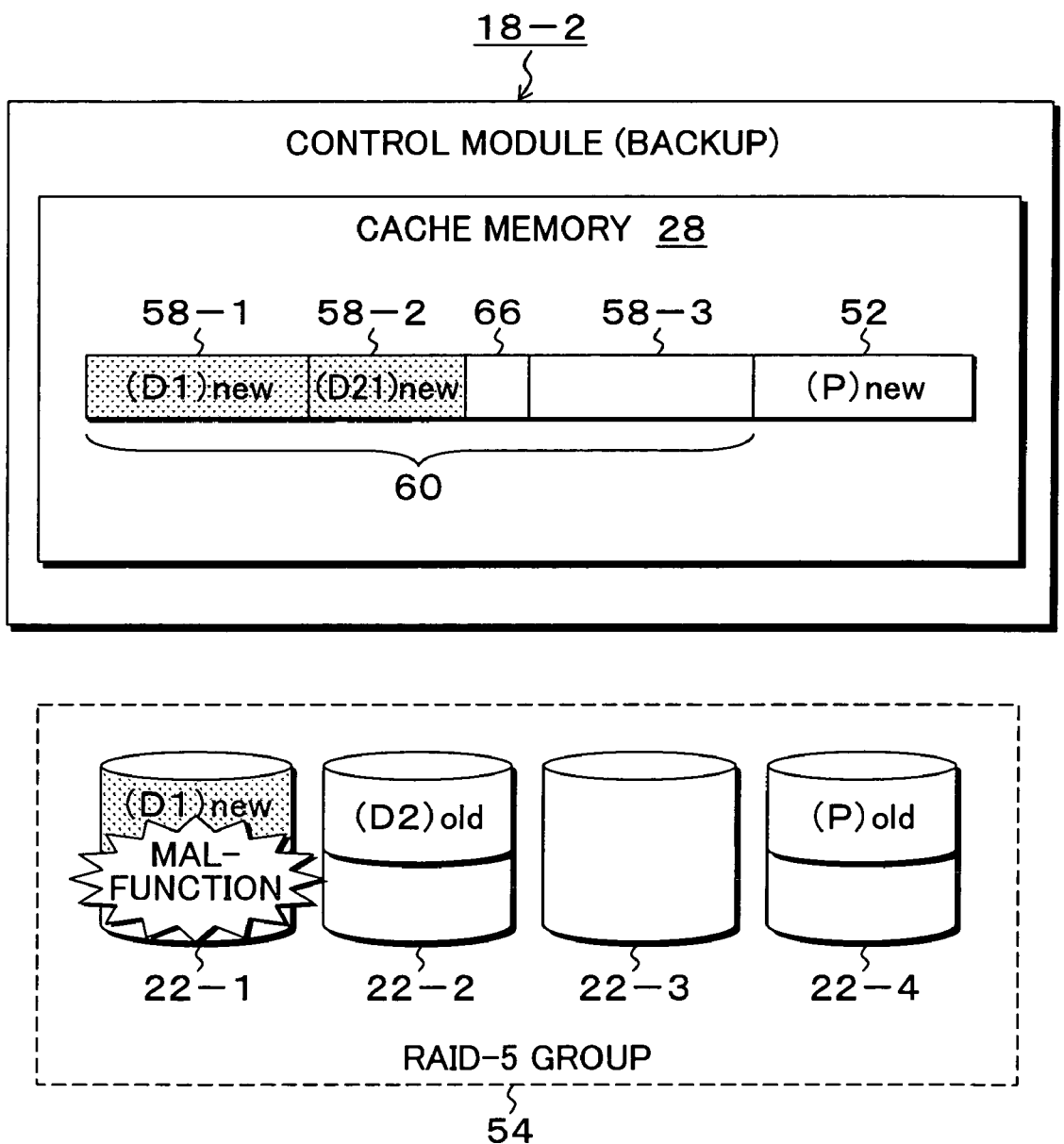
FIG. 17 is an explanatory diagram of a recovery process of the present invention for reserving a cache stripe area in the cache memory.

FIG. 17 shows a control module degenerated state in which the control module 18-1 has an error and the control is transferred to the control module 18-2, wherein, in this state, it is assumed that the disk device 22-1 provided in the RAID-5 group 54 further malfunctions due to failure or the like, and the RAID-5 group 54 is also degenerated. When the consistency of the stripe of the RAID-5 group 54 is broken and degeneration of the disk devices occurs, the recovery processing unit 46 of the present invention determines the occurrence of the error, and reserves, in the cache memory 28 in the control module 18-2 which has taken over the control, the cache stripe area 60 corresponding to the stripe of the RAID-5 group 54 of which consistency has been broken. The cache stripe area 60, which has been reserved according to the error determination, comprises the cache page 58-1 storing the new data (D1) new, the cache page 58-2 in which the new data (D21) new is partially stored and the rest is the unused area 66, and the cache page 58-3 which is an unused page. Moreover, the recovery processing unit 46 reserves the parity buffer area 52 storing the new parity (P) new, at the same time.

Figure 18:
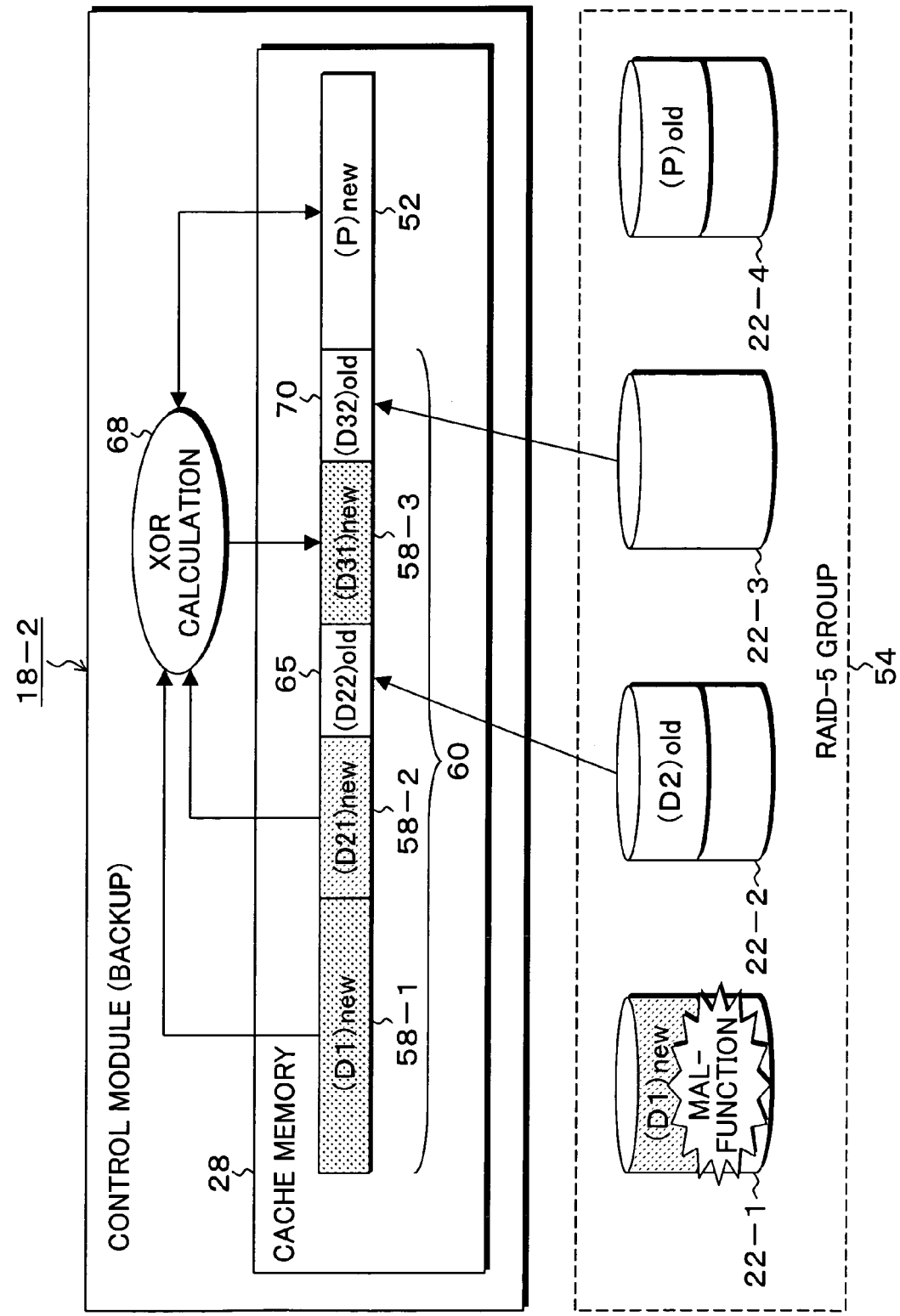
FIG. 18 is an explanatory diagram of the recovery process of the present invention for staging data to space in the cache stripe area.

Next, as shown in FIG. 18, the recovery processing unit 46 performs a calculation of exclusive OR by the operation unit 68 by use of the new data (D1) new and the new data (D21) new which are present in the cache stripe area 60 and the new parity (P) new in the parity buffer area 52, and stages new data (D31) new to the cache page 58-3 which is an unused page. Since the unused area 64 is present in the cache page 58-2, the new data (D31) new leaves an unused area 70 of the same size. With respect to such unused areas 65 and 70 to which the new data obtained through calculation of exclusive OR could not be staged in the cache stripe area 60 as described above, data is read out from the corresponding disk devices 22-2 and 22-3 of the RAID-5 group 54 and staged.

Figure 19:
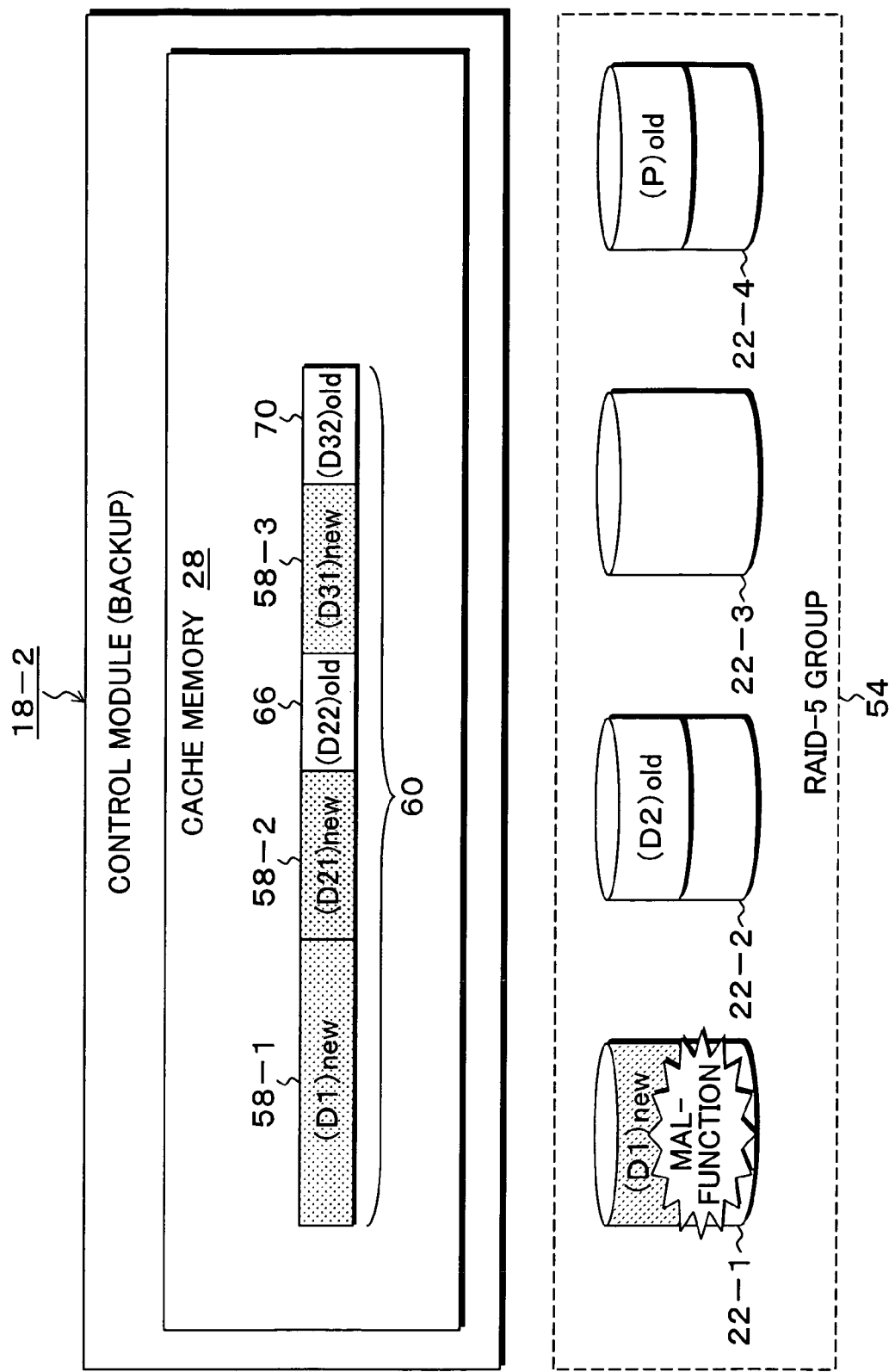
FIG. 19 is an explanatory diagram of a state, subsequent to FIG. 18, in which the parity buffer area is released.

FIG. 19 shows a state of the cache stripe area 60 to which old data (D22) old and old data (D32) old is normally staged to the unused areas 66 and 70 from the disk devices 22-2 and 22-3, and, as a result of this, all the correct data relevant to the corresponding stripe of the RAID-5 group 54 of which consistency has been broken is retained in the cache stripe area 60. In this state, the recovery processing unit 46 releases the parity buffer area 52 which has stored the new parity (P) new, and, like a normal cache area, delivers the determined cache stripe area 60 to the control of the cache control unit 42 for input/output processes performed from the hosts. Also, when, after degeneration of the RAID-5 group 54 is eliminated by, for example, repairing or replacing the disk device 22-1, the write-back conditions according to, for example, LRU control are fulfilled with respect to the cache stripe area 60, write-back processes are performed in the manner similar to a normal cache area. On the other hand, when the staging from the disk devices 22-2 and 22-3 to the unused areas 66 and 70 in FIG. 18 fails, no effective data is present in the unused areas 66 and 70 of FIG. 19; therefore, in this case, the cache stripe area 60 is designated as an access-prohibited area, and is treated as a Pinned Stripe in the below described manner by the cache control unit 42 and the write-back processing unit. Note that this point comprises the same contents as the above described (1) to (3).

(1) When read is requested from a host, hit data is subjected to read response upon cache hit, and, upon cache miss hit, read response is performed upon cache hit after executing the staging prohibiting data recovery, which is based on the redundant configuration of RAID 5, from the disk devices 22-1 to 22-4, i.e., prohibiting regeneration read.

(2) When write is requested from a host, write-data is written to the corresponding area. This is same as normal cache control.

(3) When a write-back request of a cache stripe area is generated according to, for example, LRU control, staging, to the unused area in the cache stripe area, prohibiting data recovery, which is based on the redundant configuration of RAID 5, from the disk devices, i.e., prohibiting regeneration read is executed, thereby reserving the data of the entire stripe, and, when it can be reserved, the parity buffer area 52 is reserved in the cache memory 28 and new parity data is generated from the data of the entire stripe, and then, band-wide write for writing the new data and the new parity to the corresponding disk devices is executed.

As described above, even if the unused areas 66 and 70 to which staging from the disks failed are present in the cache stripe area 60, when a read request from a host with respect to the unused areas 66 and 70 results in a miss hit, staging prohibiting regeneration read by means of data recovery, which is based on the redundant configuration, from the RAID-5 group 54 of which consistency has been broken is performed; therefore, generation of garbled data due to regeneration read in accordance with the data of which consistency has been broken can be reliably prevented.

Figure 20A:
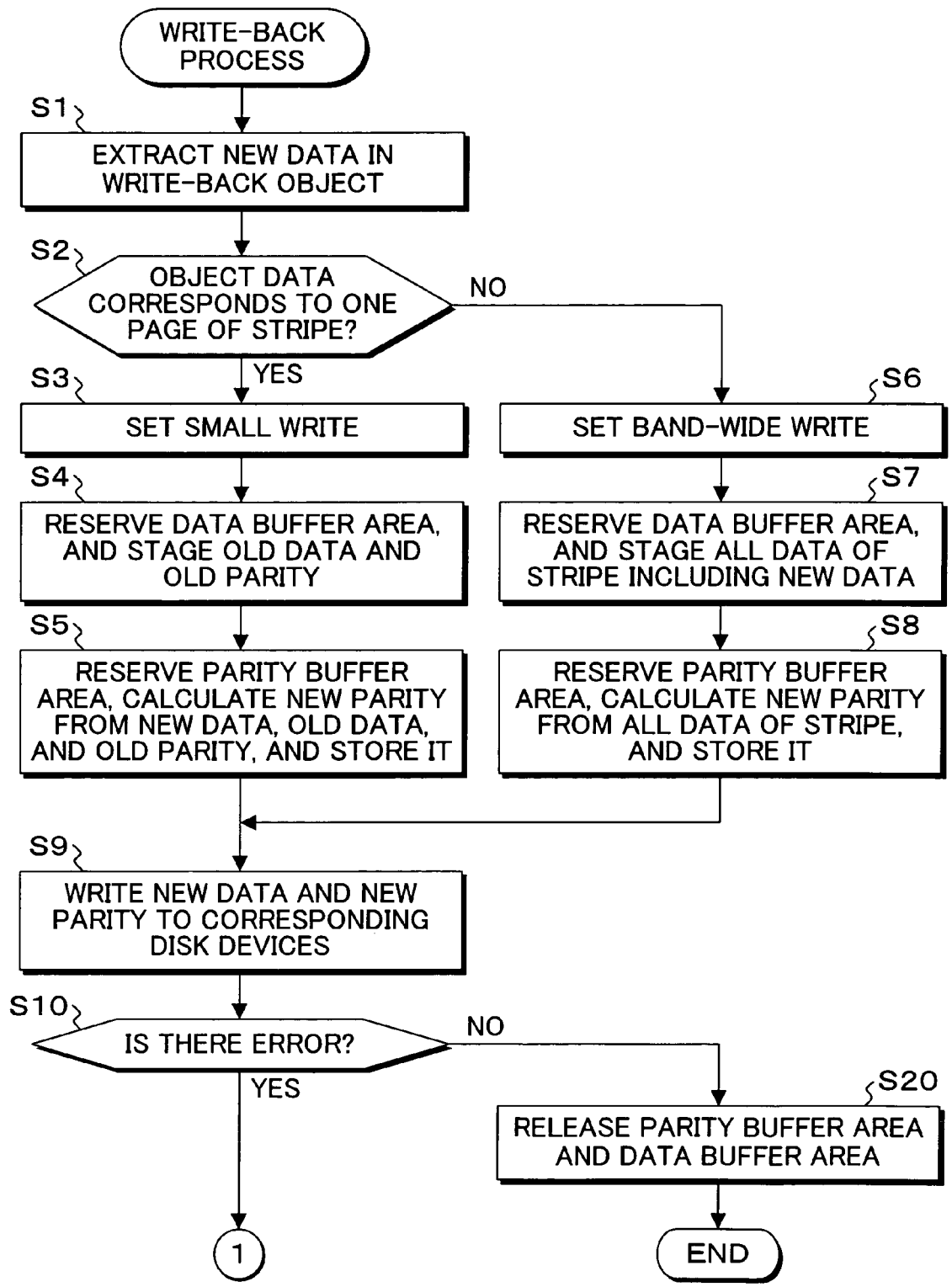

FIGS. 20A and 20B are flow charts of a write-back process including the recovery process according to the present invention. In FIGS. 20A and 20B, when the write-back conditions according to, for example, LRU are fulfilled, this write-back process is executed. In the write-back process, new data in the cache memory which is to be subjected to write back is extracted in a step S1, and then, whether the new data corresponds to one page of the object stripe or not is checked in a step S2. If it is new data corresponding to one page, small write is set in a step S3. In the small write, in a step S4, the data buffer area 50 is reserved, and old data and old parity is staged from the disk devices to the page areas which are constituting the stripe and are the areas other than that of the new data; then, in a step S5, the parity buffer area 52 is reserved, and new parity is calculated from the new data, the old data, and the old parity through a calculation of exclusive OR and stored; and then, in a step S9, the new data and the new parity is written to the corresponding disk devices. On the other hand, if the new data is data corresponding to a plurality of pages of the stripe in a step S2, the process proceeds to a step S6 wherein band-wide write is set. In the band-wide write, in a step S7, if there is any unused page, the data buffer area 50 is reserved and old data is staged from the disk device(s), and the data of the all pages of the stripe is staged; then, in a step S8, the parity buffer area 52 is reserved, and new parity is calculated from the all data of the stripe and stored; and then, in a step S9, the new data and the new parity is written to the corresponding disk devices. In a step S10 checked is presence of an error in the write to the disk devices of the write-back process in the step S9, and, if there is no error, in a step S20, the parity buffer area and the data buffer area are released so as to terminate the process. If an error is determined, the process proceeds to a step S11, wherein whether inconsistency due to errors of two or more disk devices occurred or not is checked. If it is due to an error of one disk device, the process proceeds to a step S21 wherein the error disk is set as a recovery object disk of RAID 5; and then, in a step S22, the parity buffer area and the data buffer area are released so as to terminate the process. This error of one disk device can be managed by data recovery of the error disk based on the redundant configuration of RAID 5, i.e., regeneration read. If inconsistency due to errors of two or more disk devices is determined in a step S11; the process proceeds to a step S12 wherein the recovery processing unit 46 according to the present invention places, in the cache memory, a cache stripe area of the stripe in which the errors occurred so as to stage new data, and reserves the new parity of this point of time; and, subsequently, in a step S13, whether or not there is an unused page in the cache stripe area is checked. If there is an unused page, in a step S14 performed is so-called staging in cache, in which new data for the unused page in the area is calculated from the new data and the new parity in the cache stripe area and staged. Subsequently, in a step S15, whether or not there is space in the pages of the cache stripe area is checked. If there is space within the pages, in a step S16, data is read out from the corresponding disk device(s) and staged to the unused area(s) in the pages. In a step S17, whether staging from the disk device(s) succeeded or not is checked, and if the staging fails, the process proceeds to a step S18 wherein the cache stripe area is designated as an access-restricted area, i.e., pinned stripe. Finally, in a step S19, the parity buffer area and the data buffer area are released so as to terminate the series of processes. Moreover, the present invention provides a computer provided in the RAID device, i.e., a program executed by the CPUs 24 provided in the control modules, and this program has details shown in the flow chart of FIGS. 20A and 20B. In the above described embodiment, when, as a state in which inconsistency occurs due to errors of two or more disk devices of which processes are run by the recovery processing unit 46, the control module which is in regular use malfunctions, thereby degenerating to the backup control module 18-2, and, in this control module degenerated state, one of the disk devices constituting the RAID-5 group 54 malfunctions, thereby causing degeneration, the cache stripe area 60 storing all the data corresponding to the stripe is reserved in the cache so as to subject it to cache control. However, the recovery process according to the present invention can also manage a case in which the error state practically same as the inconsistency occurrence due to errors of two disk devices is generated in an error state other than that described above. In addition, the present invention includes appropriate modifications that do not impair the objects and the advantages thereof, and is not limited by the numerical values shown in the above described embodiment.

What is claimed is:

1. A storage system characterized by comprising
   a cache control unit for managing data in a cache memory in a page area unit, and processing an input/output request from an upper-level device to a storage device;
   a Redundant Arrays of Inexpensive Disks (RAID) control unit for managing data in each of a plurality of the storage devices in a strip area unit having the same size as a page area in the page area unit and managing a plurality of strip areas for data and one strip area for parity having the same address collectively in the strip area unit, and forming a redundant configuration of RAID 5 in which the storage device on which the strip area for parity is placed is changed every time the address of the stip area is changed;
   a write-back processing unit for, when a write-back request for writing back new data in the cache memory to the storage device is generated, reserving a parity buffer area in the cache memory, generating new parity, and then, writing the new data and the new parity to corresponding storage devices of said plurality of storage devices; and
   a recovery processing unit for, when an error in which the consistency of RAID 5 is broken occurs in a plurality of the storage devices upon write performed by the write-back processing unit, reserving, in the cache memory, a cache strip area storing data of the entire stip including the new data which is to be written back, and causing the cache control unit to manage it.

2. The storage system according to claim 1 characterized in that, when errors occur in two or more storage devices upon write performed by the write-back processing unit, the recovery processing unit determines that the error in which the consistency of the RAID 5 is broken has occurred.

3. The storage system according to claim 1 characterized in that, after reserving the cache strip area, the recovery processing unit causes the write-back processing unit to release the parity buffer area storing the new parity.

4. The storage system according to claim 1 characterized in that, if an unused area is present in the cache strip area, the recovery processing unit stages new data, which is obtained through exclusive OR of new data which is in the same area and the new parity in the parity buffer area, to the unused area.

5. The storage system according to claim 1 characterized in that, if an unused area to which new data obtained through exclusive OR of new data which is in the same area and the new parity in the parity buffer area cannot be staged is present in the cache strip area, the recovery processing unit stages data, which is read out from the storage device, to the unused area.

6. The storage system according to claim 5 characterized in that, if the staging of data from the storage device to the unused area fails, the recovery processing unit designates the cache strip area as an access-restricted area, and causes the cache control unit to manage it.

7. The storage system according to claim 6 characterized in that, if read is requested from an upper-level device to the cache strip area which is designated as the access-restricted area, the cache control unit subjects hit data to read response upon cache hit, and, upon cache miss hit, performs read response upon cache hit after executing staging prohibiting data recovery, which is based on the redundant configuration of RAID 5, from the storage devices.

8. The storage system according to claim 7 characterized in that, if write is requested from an upper-level device to the cache strip area which is designated as the access-restricted area, the cache control unit writes write data to a corresponding area.

9. The storage system according to claim 7 characterized in that, if a write-back request of the cache strip area, which is designated as the access-restricted area, is generated after the errors of the storage devices are eliminated, and if the write-back processing unit executes staging prohibiting data recovery, which is based on the redundant configuration of RAID 5, from the storage devices to the unused area in the cache strip, area and data of the entire strip is reserved, the write-back processing unit reserves a parity buffer area in the cache memory and generates new parity data from the data of the entire strip, and then, writes the new data and the new parity to the corresponding storage devices.

10. A control method of a storage system characterized by comprising a cache control step of managing data in a cache memory in a page area unit, and processing an input/output request from an upper-level device to a storage device;

a Redundant Arrays of Inexpensive Disks (RAID) control step of managing data in each of a plurality of the storage devices in a strip area unit having the same size as the page area in the page area unit and managing a plurality of strip areas for data and one strip area for parity having the same address collectively in the strip area unit, and forming a redundant configuration of RAID 5 in which the storage device on which the strip area for parity is placed is changed every time the address of the strip area is changed;

a write-back processing step of, when a write-back request for writing back new data in the cache memory to the storage device is generated, reserving a parity buffer area in the cache memory, generating new parity, and then, writing the new data and the new parity to corresponding storage devices of said plurality of storage devices; and an error recovery processing step of, when an error in which the consistency of RAID 5 is broken occurs in a plurality of the storage devices upon write according to the write-back processing step, reserving, in the cache memory, a cache strip area storing data of the entire strip including the new data which is to be written back, and causing the cache control step to manage it.

11. The control method of a storage system according to claim 10 characterized in that, when errors occur in two or more storage devices upon write according to the write-back processing step, in the error recovery processing step, occurrence of the error in which the consistency of the RAID 5 is broken is determined.

12. The control method of a storage system according to claim 10 characterized in that, after reserving the cache strip area, the error recovery processing step causes the write-back processing step to release the parity buffer area storing the new parity.

13. The control method of a storage system according to claim 10 characterized in that, if an unused area is present in the cache strip area, in the error recovery processing step, new data, which is obtained through exclusive OR of new data which is in the same area and the new parity in the parity buffer area, is staged to the unused area.

14. The control method of a storage system according to claim 10 characterized in that, if an unused area to which new data obtained through exclusive OR of new data which is in the same area and the new parity in the parity buffer area cannot be staged is present in the cache strip area, in the error recovery processing step, data, which is read out from the storage device, is staged to the unused area.

15. The control method of a storage system according to claim 14 characterized in that, if the staging of data from the storage device to the unused area fails, in the error recovery processing step, the cache strip area is designated as an access-restricted area, and the cache control step is caused to manage it.

16. The control method of a storage system according to claim 15 characterized in that, if read is requested from an upper-level device to the cache strip area which is designated as the access-restricted area, in the cache control step, hit data is subjected to read response upon cache hit, and, upon cache miss hit, read response is performed upon cache hit after executing staging prohibiting data recovery, which is based on the redundant configuration of RAID 5, from the storage devices.

17. The control method of a storage system according to claim 16 characterized in that, if write is requested from an upper-level device to the cache strip area which is designated as the access-restricted area, in the cache control step, write data is written to a corresponding area.

18. The control method of a storage system according to claim 16 characterized in that, if a write-back request of the cache strip area, which is designated as the access-restricted area, is generated after the errors of the storage devices are eliminated, and if staging prohibiting data recovery, which is based on the redundant configuration of RAID 5, is executed from the storage devices to the unused area in the cache strip area and data of the entire a strip is reserved, in the write-back processing step, a parity buffer area is reserved in the cache memory and new parity data is generated from the data of the entire, and then, the new data and the new parity is written to the corresponding storage devices.

19. A computer-readable medium including a program for controlling a storage system, wherein said program allows a computer to execute:

a cache control step of managing data in a cache memory in a page area unit, and processing an input/output request from an upper-level device to a storage device;

a Redundant Arrays of Inexpensive Disk (RAID)control step of managing data in each of a plurality of the storage devices in a strip area unit having the same size as the page area in the page area unit and managing a plurality of strip areas for data and one strip area for parity having the same address collectively in the strip area unit, and forming a redundant configuration of RAID 5 in which the storage device on which the strip area for parity is placed is changed every time the address of the strip area is changed;

a write-back processing step of, when a write-back request for writing back new data in the cache memory to the storage device is generated, reserving a parity buffer area in the cache memory, generating new parity, and then, writing the new data and the new parity to the corresponding storage devices of said plurality of storage devices; and an error recovery processing step of, when an error in which the consistency of RAID 5 is broken occurs in a plurality of the storage devices upon write according to the write-back processing step, reserving, in the cache memory, a cache strip area storing data of the entire strip including the new data which is to be written back, and causing the cache control step to manage it.

20. The computer-readable medium of claim 19 characterized in that, when errors occur in two or more storage devices upon write according to the write-back processing step, in the error recovery processing step, occurrence of the error in which the consistency of the RAID 5 is broken is determined.

* * * * *